US008249993B2

(12) United States Patent  
von Mueller

(10) Patent No.: US 8,249,993 B2
(45) Date of Patent: Aug. 21, 2012

(54) TRANSPARENTLY SECURING DATA FOR TRANSMISSION ON FINANCIAL NETWORKS

(75) Inventor: Clay von Mueller, San Diego, CA (US)

(73) Assignee: Verifone, Inc., San Jose, CA (US)

( * ) Notice: Subject to any disclaimer, the term of this patent is extended or adjusted under 35 U.S.C. 154(b) by 257 days.

(21) Appl. No.: 12/110,106

(22) Filed: Apr. 25, 2008

(65) Prior Publication Data

US 2008/0243701 A1    Oct. 2, 2008

Related U.S. Application Data

(63) Continuation of application No. 11/127,862, filed on May 12, 2005, now Pat. No. 7,506,812, which is a continuation-in-part of application No. 10/936,359, filed on Sep. 7, 2004, now Pat. No. 7,309,012.

(51) Int. Cl.
*G06Q 20/00* (2012.01)
*G06Q 30/00* (2012.01)
(52) U.S. Cl. ........................ 705/75; 705/14.23
(58) Field of Classification Search .................. None
See application file for complete search history.

(56) References Cited

U.S. PATENT DOCUMENTS

| | | | |
|---|---|---|---|
| 3,953,887 A | 4/1976 | Kobylarz et al. | |
| 3,962,726 A | 6/1976 | DeLand et al. | |
| 4,028,734 A | 6/1977 | Mos | |
| 4,297,735 A | 10/1981 | Eppich | |
| 4,319,131 A | 3/1982 | McGeary et al. | |
| 4,628,195 A | 12/1986 | Baus | |
| 4,650,978 A | 3/1987 | Hudson et al. | |
| 4,705,939 A | 11/1987 | Ulinski | |
| 4,837,426 A | 6/1989 | Pease | |
| 4,906,988 A | 3/1990 | Copella | |
| 4,944,619 A | 7/1990 | Suzuki et al. | |

(Continued)

FOREIGN PATENT DOCUMENTS

EP     0644474     3/1995

(Continued)

OTHER PUBLICATIONS

"Check Digits" (dated Jun. 26, 2003). http://www.delphiforfun.org/Programs/Check_digits.htm. [Retrieved via Wayback Machine].*

(Continued)

*Primary Examiner* — James A Reagan
*Assistant Examiner* — Calvin Cheung
(74) *Attorney, Agent, or Firm* — Sheppard Mullin Richter & Hampton LLP

(57) ABSTRACT

Systems and methods for performing financial transactions are provided. In one embodiment, the invention provides a method for processing token data for a bank card transaction, the method includes: receiving a string of first token data from a token at a token reader; modifying the first token data and generating second token data, the second token data including modified token data; performing a modulo arithmetic operation on the second token data and determining a mod 10 check digit that will cause a modulo arithmetic check of the second token data to yield the same result as the modulo arithmetic check would yield on the first token data; and inserting the mod 10 check digit in the second data string and forwarding the second data string for the transaction.

26 Claims, 23 Drawing Sheets

U.S. PATENT DOCUMENTS

| | | |
|---|---|---|
| 4,949,192 A | 8/1990 | McGreary |
| 5,010,240 A | 4/1991 | Sheldon |
| 5,097,504 A | 3/1992 | Camion et al. |
| 5,101,097 A | 3/1992 | Conant |
| 5,126,990 A | 6/1992 | Efron et al. |
| 5,214,409 A | 5/1993 | Beigel |
| 5,233,169 A | 8/1993 | Longacre |
| 5,235,166 A | 8/1993 | Fernandez |
| 5,254,843 A | 10/1993 | Hynes et al. |
| 5,257,320 A | 10/1993 | Etherington et al. |
| 5,270,523 A | 12/1993 | Chang et al. |
| 5,336,871 A | 8/1994 | Colgate |
| 5,354,097 A | 10/1994 | Tel |
| 5,358,088 A | 10/1994 | Kryder et al. |
| 5,365,586 A | 11/1994 | Indeck et al. |
| 5,367,581 A | 11/1994 | Abel et al. |
| 5,393,966 A | 2/1995 | Gatto et al. |
| 5,396,369 A | 3/1995 | Deland, Jr. et al. |
| 5,408,505 A | 4/1995 | Indeck et al. |
| 5,412,718 A | 5/1995 | Narasimhalu |
| 5,428,683 A | 6/1995 | Indeck et al. |
| 5,430,279 A | 7/1995 | Fernandez |
| 5,459,629 A | 10/1995 | Wakasugi |
| 5,461,525 A | 10/1995 | Christianson et al. |
| 5,479,509 A | 12/1995 | Ugon |
| 5,546,462 A | 8/1996 | Indeck et al. |
| 5,552,947 A | 9/1996 | Nakanishi et al. |
| 5,569,898 A | 10/1996 | Fisher et al. |
| 5,570,339 A | 10/1996 | Nagano |
| 5,572,507 A | 11/1996 | Ozaki et al. |
| 5,587,654 A | 12/1996 | Indeck et al. |
| 5,603,078 A | 2/1997 | Henderson |
| 5,616,904 A | 4/1997 | Fernandez |
| 5,625,689 A | 4/1997 | Indeck et al. |
| 5,644,636 A | 7/1997 | Fernandez |
| 5,657,389 A | 8/1997 | Houvener |
| 5,685,657 A | 11/1997 | Jablonski |
| 5,691,526 A | 11/1997 | Evans |
| 5,708,422 A | 1/1998 | Blonder et al. |
| 5,740,244 A | 4/1998 | Indeck et al. |
| 5,767,495 A | 6/1998 | DeLand |
| 5,770,846 A | 6/1998 | Mos |
| 5,780,828 A | 7/1998 | Mos et al. |
| 5,814,796 A | 9/1998 | Benson et al. |
| 5,829,743 A | 11/1998 | DeLand et al. |
| 5,920,628 A | 7/1999 | Indeck et al. |
| 5,930,794 A | 7/1999 | Linenbach et al. |
| 5,959,794 A | 9/1999 | Indeck et al. |
| 6,024,288 A | 2/2000 | Gottlich |
| 6,038,321 A | 3/2000 | Torigai et al. |
| 6,053,406 A | 4/2000 | Litman |
| 6,098,881 A | 8/2000 | DeLand et al. |
| 6,105,011 A | 8/2000 | Morrison |
| 6,123,259 A | 9/2000 | Ogasawara |
| 6,260,146 B1 | 7/2001 | Mos et al. |
| 6,266,647 B1 | 7/2001 | Fernandez |
| 6,308,886 B1 | 10/2001 | Benson et al. |
| 6,335,799 B1 | 1/2002 | Provost |
| 6,430,008 B1 | 8/2002 | Trabert et al. |
| 6,431,445 B1 | 8/2002 | DeLand et al. |
| 6,476,991 B1 | 11/2002 | Fernandez |
| 6,480,356 B1 | 11/2002 | Mos |
| 6,543,689 B2 | 4/2003 | Sabella |
| 6,641,050 B2 | 11/2003 | Kelley et al. |
| 6,644,547 B1 | 11/2003 | White |
| 6,678,103 B2 | 1/2004 | Fernandez et al. |
| 6,678,823 B1 | 1/2004 | Fernandez |
| 6,760,841 B1 | 7/2004 | Fernandez |
| 6,781,781 B2 | 8/2004 | Wood |
| 6,830,182 B2 | 12/2004 | Izuyama |
| 6,830,183 B2 | 12/2004 | Von Mueller et al. |
| 6,837,435 B2 | 1/2005 | Kehoe et al. |
| 6,885,748 B1 | 4/2005 | Wang |
| 6,899,269 B1 | 5/2005 | Deland |
| 6,901,375 B2 | 5/2005 | Fernandez |
| 6,944,782 B2 | 9/2005 | Von Mueller et al. |
| 6,963,980 B1 | 11/2005 | Mattsson |
| 6,993,130 B1 | 1/2006 | Fernandez et al. |
| 7,013,393 B1 | 3/2006 | Stevens |
| 7,068,207 B2 | 6/2006 | Fujita et al. |
| 7,068,787 B1 | 6/2006 | Ta et al. |
| 7,103,575 B1 | 9/2006 | Lineham |
| 7,113,930 B2 | 9/2006 | Eccles |
| 7,120,933 B2 | 10/2006 | Mattsson |
| 7,305,707 B2 | 12/2007 | Mattsson |
| 7,313,822 B2 | 12/2007 | Ben-Itzhak |
| 7,325,129 B1 | 1/2008 | Mattsson |
| 7,418,098 B1 | 8/2008 | Mattsson |
| 7,490,248 B1 | 2/2009 | Valfridsson |
| 7,539,857 B2 | 5/2009 | Bartlett |
| 7,548,622 B2 | 6/2009 | Carr |
| 2001/0047355 A1 | 11/2001 | Anwar |
| 2002/0017559 A1 | 2/2002 | Mos et al. |
| 2002/0017560 A1 | 2/2002 | Mos et al. |
| 2002/0023215 A1 | 2/2002 | Wang et al. |
| 2002/0046338 A1 | 4/2002 | Ueda et al. |
| 2002/0145051 A1 | 10/2002 | Charrin |
| 2002/0152180 A1 | 10/2002 | Turgeon |
| 2002/0178145 A1 | 11/2002 | Ishida |
| 2003/0028481 A1 | 2/2003 | Flitcroft et al. |
| 2003/0061156 A1 | 3/2003 | Lim |
| 2003/0061171 A1 | 3/2003 | Gilbert et al. |
| 2003/0085277 A1 | 5/2003 | DeLand et al. |
| 2003/0089774 A1 | 5/2003 | Schmieder et al. |
| 2003/0105725 A1 | 6/2003 | Hoffman |
| 2003/0105967 A1 | 6/2003 | Nam |
| 2003/0145205 A1 | 7/2003 | Sarcanin |
| 2003/0146846 A1 | 8/2003 | Fujita et al. |
| 2003/0192948 A1 | 10/2003 | Izuyama |
| 2003/0213840 A1 | 11/2003 | Livingston et al. |
| 2004/0006699 A1 | 1/2004 | Von Mueller |
| 2004/0044739 A1* | 3/2004 | Ziegler .................. 709/213 |
| 2004/0049777 A1 | 3/2004 | Sullivan |
| 2004/0058705 A1* | 3/2004 | Morgan et al. ............. 455/556.1 |
| 2004/0203930 A1 | 10/2004 | Farchmin et al. |
| 2004/0238627 A1 | 12/2004 | Silverbrook et al. |
| 2005/0036611 A1 | 2/2005 | Seaton, Jr. et al. |
| 2005/0044044 A1 | 2/2005 | Burger et al. |
| 2005/0119978 A1* | 6/2005 | Ates ........................ 705/67 |
| 2005/0127164 A1* | 6/2005 | Wankmueller ............... 235/380 |
| 2005/0149739 A1* | 7/2005 | Hopkins et al. ............... 713/184 |
| 2005/0167495 A1 | 8/2005 | Morley et al. |
| 2005/0167496 A1 | 8/2005 | Morely et al. |
| 2005/0173530 A1 | 8/2005 | DeLand et al. |
| 2005/0184165 A1 | 8/2005 | Jong |
| 2005/0198318 A1 | 9/2005 | Von Mueller |
| 2005/0218229 A1 | 10/2005 | Morley, Jr. et al. |
| 2005/0228688 A1 | 10/2005 | Visser et al. |
| 2005/0247787 A1 | 11/2005 | Von Mueller |
| 2006/0046842 A1 | 3/2006 | Mattice et al. |
| 2006/0049255 A1 | 3/2006 | von Mueller et al. |
| 2006/0049256 A1 | 3/2006 | Von Mueller |
| 2006/0061503 A1 | 3/2006 | Fujita et al. |
| 2006/0179296 A1 | 8/2006 | Bartlett |
| 2006/0249574 A1 | 11/2006 | Brown et al. |
| 2007/0067634 A1 | 3/2007 | Siegler |
| 2007/0067637 A1 | 3/2007 | Mattsson |
| 2007/0101425 A1 | 5/2007 | Mattsson |
| 2007/0242829 A1 | 10/2007 | Pedlow |
| 2008/0022136 A1 | 1/2008 | Mattsson |
| 2008/0082834 A1 | 4/2008 | Mattsson |
| 2008/0082837 A1 | 4/2008 | Mattsson |
| 2008/0084995 A1 | 4/2008 | Rodgers |
| 2008/0098393 A1 | 4/2008 | Chai et al. |
| 2008/0165973 A1 | 7/2008 | Miranda Gavillan et al. |
| 2008/0170693 A1 | 7/2008 | Spies et al. |
| 2008/0189214 A1* | 8/2008 | Mueller et al. .................. 705/65 |
| 2009/0025057 A1 | 1/2009 | Mattsson |
| 2009/0048953 A1* | 2/2009 | Hazel et al. ..................... 705/35 |
| 2009/0089591 A1 | 4/2009 | Mattsson |

FOREIGN PATENT DOCUMENTS

| | | |
|---|---|---|
| EP | 1363226 | 5/2002 |
| EP | 1460593 | 9/2004 |
| WO | 97/30533 | 8/1997 |
| WO | 02/43014 | 5/2002 |
| WO | 02/43015 | 5/2002 |

| | | |
|---|---|---|
| WO | 01/65512 | 7/2002 |
| WO | 02/067157 | 8/2002 |
| WO | 2006/010947 | 2/2006 |
| WO | 2006/020320 | 2/2006 |
| WO | 2006/111022 | 10/2006 |
| WO | 2008/100396 | 8/2008 |

OTHER PUBLICATIONS

"Credit Card Validation—Check Digits" (dated Jan. 17, 1999). http://www.beachnet.com/~hstiles/cardtype.html. [Retrieved via Wayback Machine].*
NuGen I.T., "Response to CCIF Parts and Material Committee", Enterprise Workflow, NuGen I.T., The Internet Integration Company.
CCC Information Services, Inc., "How to Read an Estimate Quality Review," (2005), http://www.ccis.com.
M. Bellare, K. Pietrzak, and P. Rogaway. Improved Security Analyses for CBC MACs. Advances in Cryptology—CRYPTO '05, LNCS vol. 3621, pp. 527-545, Springer, 2005.
Bellare, M., Rogaway, P. The Security of Triple Encryption and a Framework for Code-Based Game-Playing Proofs. Advances in Cryptology—EUROCRYPT '06, LNCS vol. 4004, pp. 409-426, Springer, 2006.
M. Bellare, A. Boldyreva, and A. O'Neill. Deterministic and efficiently searchable encryption. Advances in Cryptology—CRYPTO '07, LNCS vol. 4622, pp. 535-552, Springer, 2007.
M. Bellare, M. Fischlin, A. O'Neill, and T. Ristenpart. Deterministic encryption: Definitional equivalences and constructions without random oracles. Advances in Cryptology—CRYPTO '08, LNCS vol. 5157, pp. 360-378, Springer, 2008.
J. Black and P. Rogaway. CBC MACs for Arbitrary-Length Messages: The Three-Key Constructions. J. of Cryptology, vol. 18, No. 2, pp. 111-131, 2005.
J. Black and P. Rogaway. Ciphers with arbitrary finite domains. Topics in Cryptology—CT-RSA '02, LNCS vol. 2271, Springer, pp. 114-130, 2002.
J. Black, S. Halevi, H. Krawczyk, T. Krovetz, and P. Rogaway. UMAC: Fast and Secure Message Authentication. Advances in Cryptology—CRYPTO '99, LNCS vol. 1666. pp. 216-233, Springer, 1999.
J. Black and P. Rogaway. A Block-Cipher Mode of Operation for Parallelizable Message Authentication. Advances in Cryptology—Eurocrypt '02, LNCS vol. 2332, pp. 384-397, Springer, 2002.
A. Boldyreva, S. Fehr, and A. O'Neill. On notions of security for deterministic encryption, and efficient constructions without random oracles. Advances in Cryptology—CRYPTO '08, LNCS vol. 5157, pp. 335-359 Springer, 2008.
ISO/IEC 7812-1:2006. Identification cards—Identification of issuers—Part 1: Numbering system, Oct. 15, 2006.
T. Iwata and K. Kurosawa. OMAC: One-Key CBC MAC. Fast Software Encryption—FSE '03, LNCS vol. 2887, pp. 129-153, Springer, 2003.
M. Liskov, R. Rivest, and D. Wagner. Tweakable block ciphers. Advances in Cryptology—CRYPTO 2002, LNCS vol. 2442, Springer, pp. 31-46, 2002.
M. Luby and C. Rackoff. How to construct pseudorandom permutations from pseudorandom functions. SIAM Journal of Computing, vol. 17, No. 2, pp. 373-386, 1988.
S. Lucks. Faster Luby-Rackoff ciphers. Fast Software Encryption 1996, LNCS vol. 1039, Springer, pp. 189-203, 1996.
U. Maurer and K. Pietrzak. The Security of Many-Round Luby-Rackoff Pseudo-Random Permutations. Advances in Cryptology—EUROCRYPT '03, LNCS vol. 2656, pp. 544-561, Springer, 2003.
M. Naor and O. Reingold. On the construction of pseudorandom permutations: Luby-Rackoff revisited. Journal of Cryptology, vol. 12, No. 1, pp. 29-66, 1999.
J. Patarin. New Results on Pseudorandom Permutation Generators Based on the DES Scheme. Advances in Cryptology—CRYPTO '91, LNCS vol. 576, Springer, pp. 301-312, 1991.
J. Patarin. Generic Attacks on Feistel Schemes. Advances in Cryptology—ASIACRYPT '01, LNCS vol. 2248, Springer, pp. 222-238, 2001.
J. Patarin. Luby-Rackoff: 7 Rounds Are Enough for 2n(1-Q) Security. Advances in Cryptology—CRYPTO '03, LNCS vol. 2729, Springer, pp. 513-529, 2003.
J. Patarin. Security of Random Feistel Schemes with 5 or More Rounds. Advances in Cryptology—CRYPTO '04, LNCS vol. 3152, Springer, pp. 106-122, 2004.
S. Patel, Z. Ramzan, and G. Sundaram. Efficient constructions of variable-input-length block ciphers. Selected Areas in Cryptography 2004, LNCS vol. 3357, pp. 326-340, 2004.
PCI Security Standards Council. Payment Card Industry Data Security Standard Version 1.2. Available from https://www.pcisecuritystandards.org/security_standards/pci_dss.shtml, Oct. 2008.
B. Schneier and J. Kelsey. Unbalanced Feistel networks and block cipher design. Fast Software Encryption 1996, LNCS vol. 1039, Springer, pp. 121-144, 1996.
R. Schroeppel. Hasty pudding cipher specification. First AES Candidate Workshop, 1998.
T. Spies. Feistel Finite Set Encryption Mode. http://csrc.nist.gov/groups/ST/toolkit/15 BCM/documents/proposedmodes/ffsem/ffsem-spec.pdf.
Mattson, Ulf T., Format-Controlling Encryption Using Datatype-preserving Encryption.
Mattson, Ulf T., DB2 Security and PCI Compliance: A Best Practice Guide.
Satti, M.V. Kartik, A Quasigroup Based Cryptographic System.
CISCO Systems. Security: AP/Root Radio Data Encryption.
Crocker, David H., Standard for the Format of ARPA Internet Text Messages, RFC 822, Aug. 13, 1982.

* cited by examiner

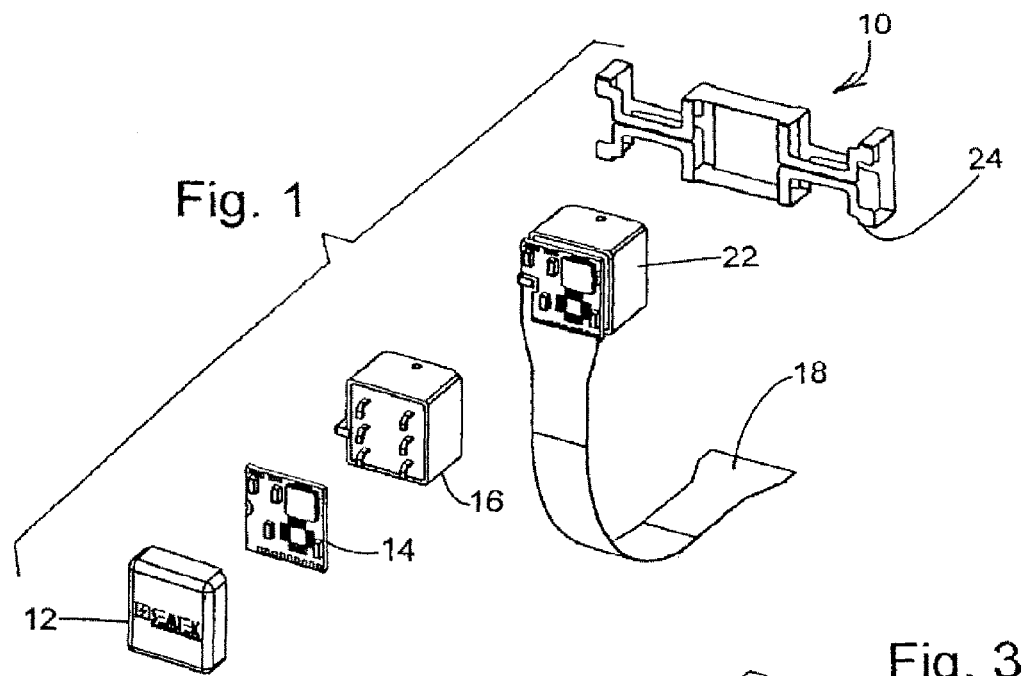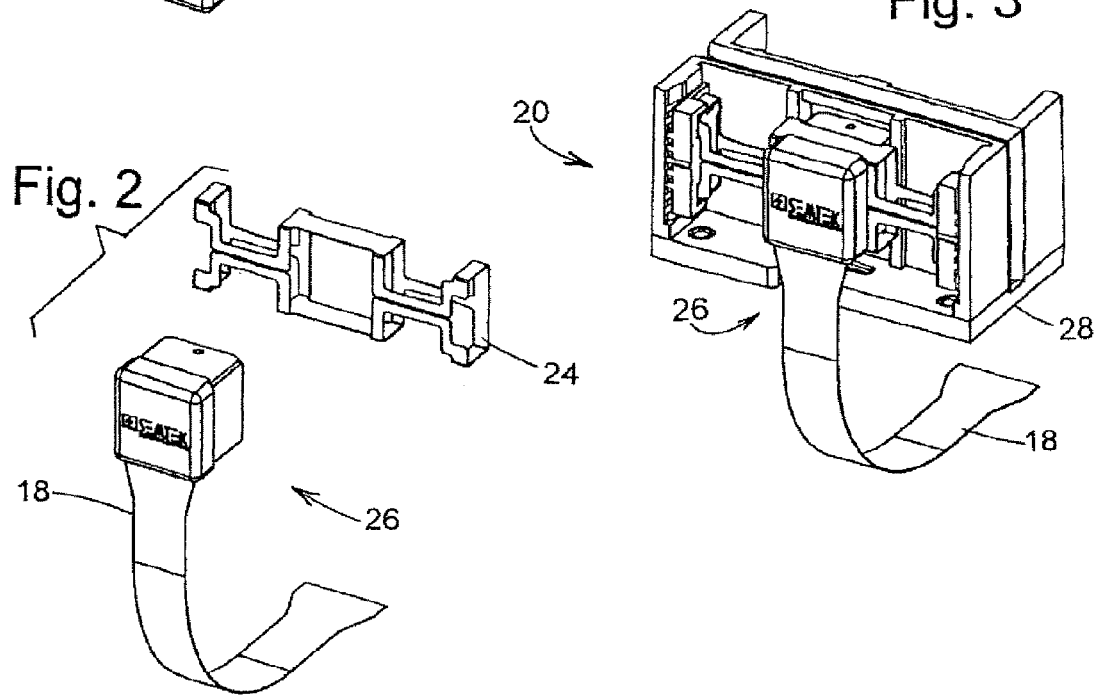

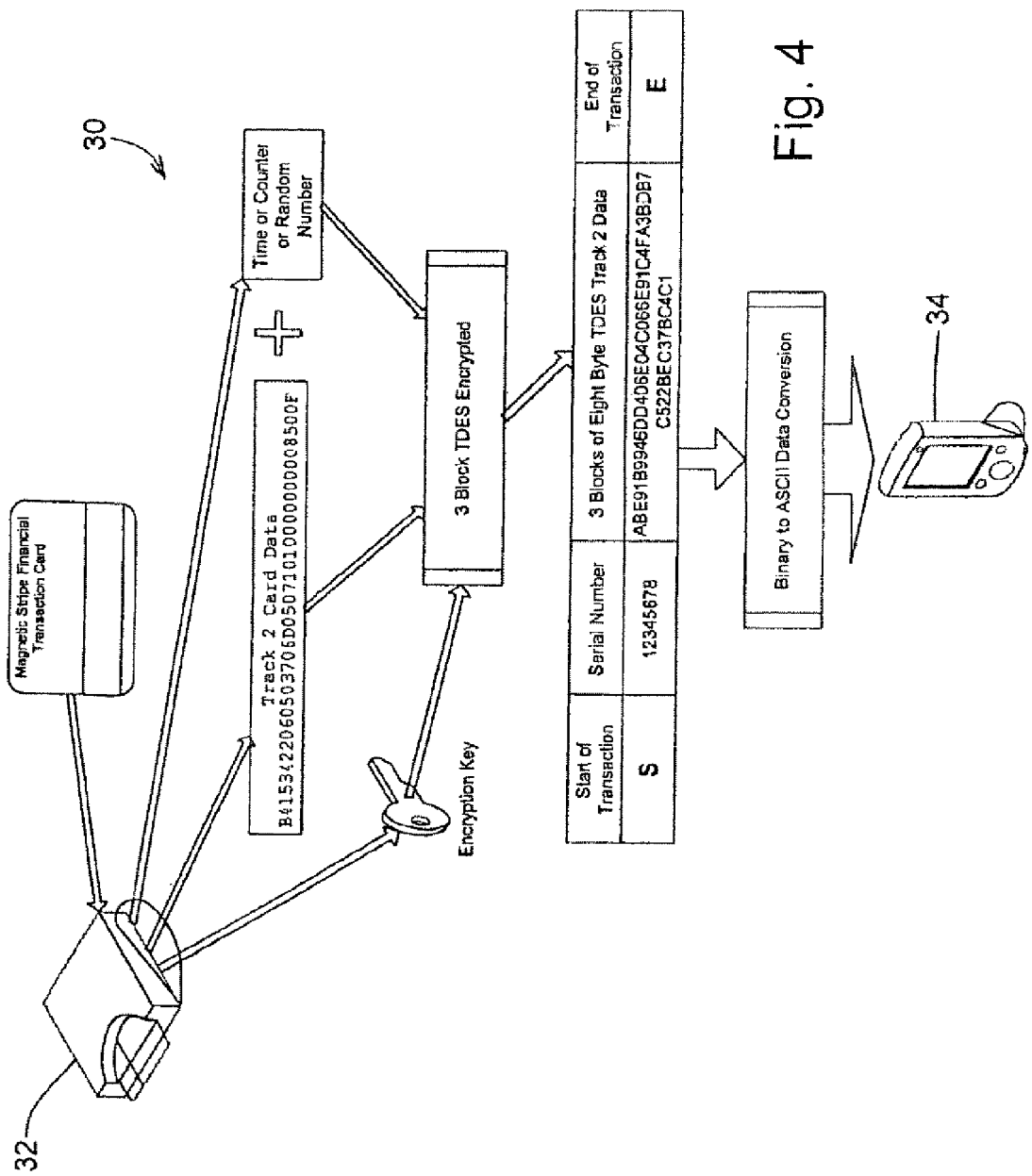

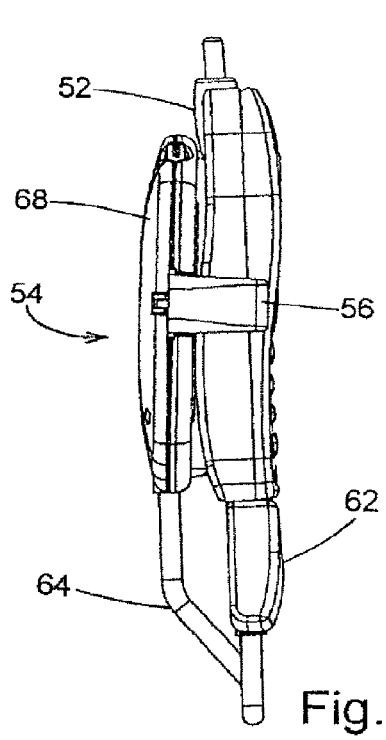
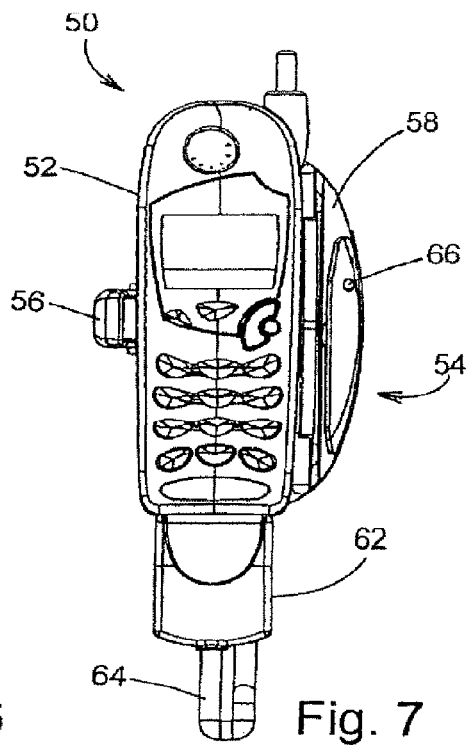
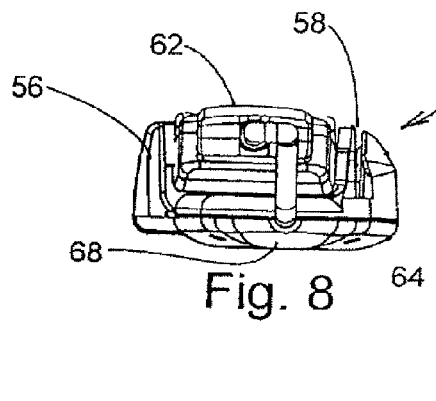
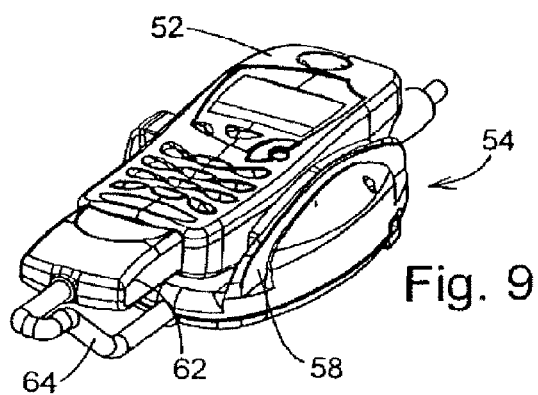

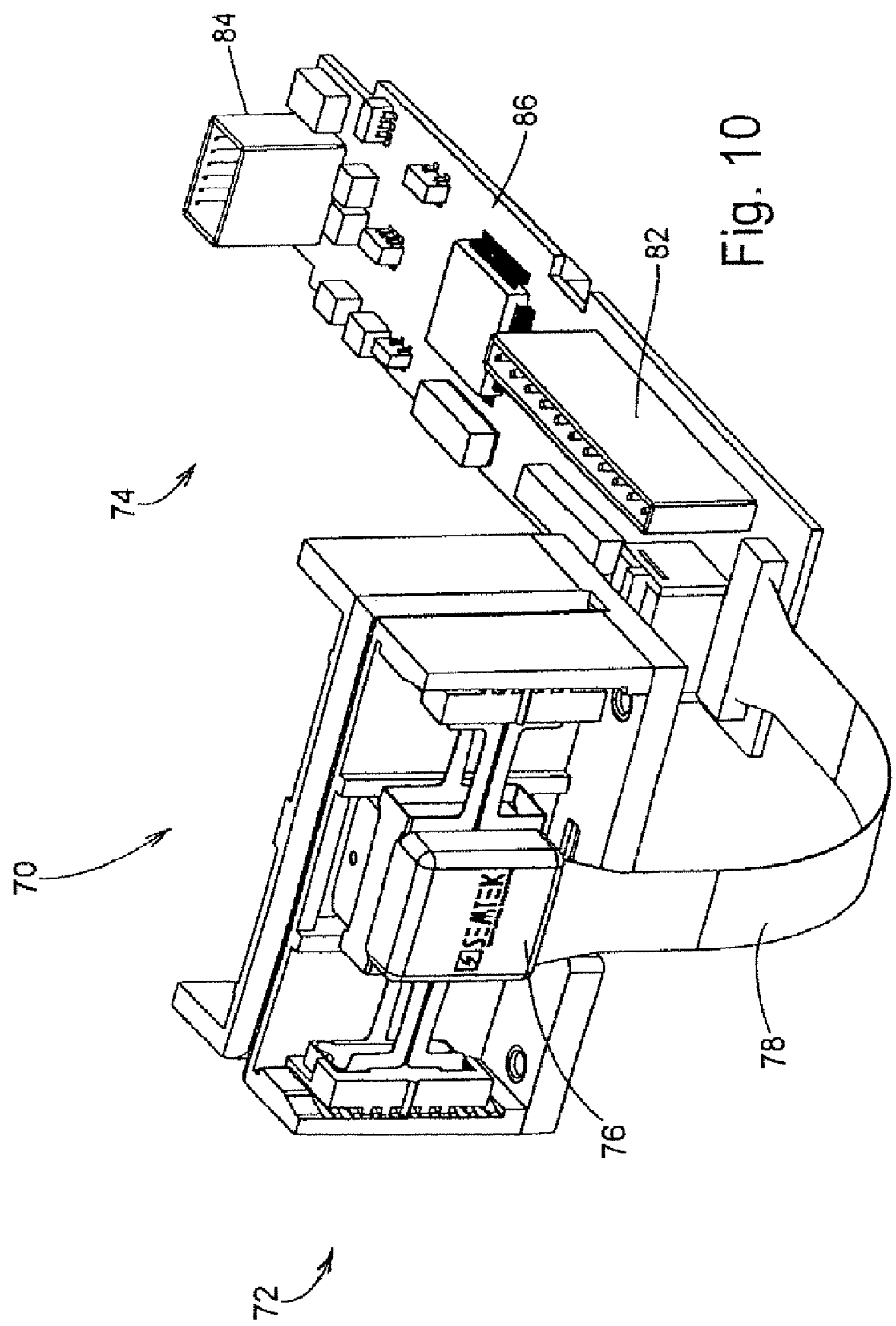

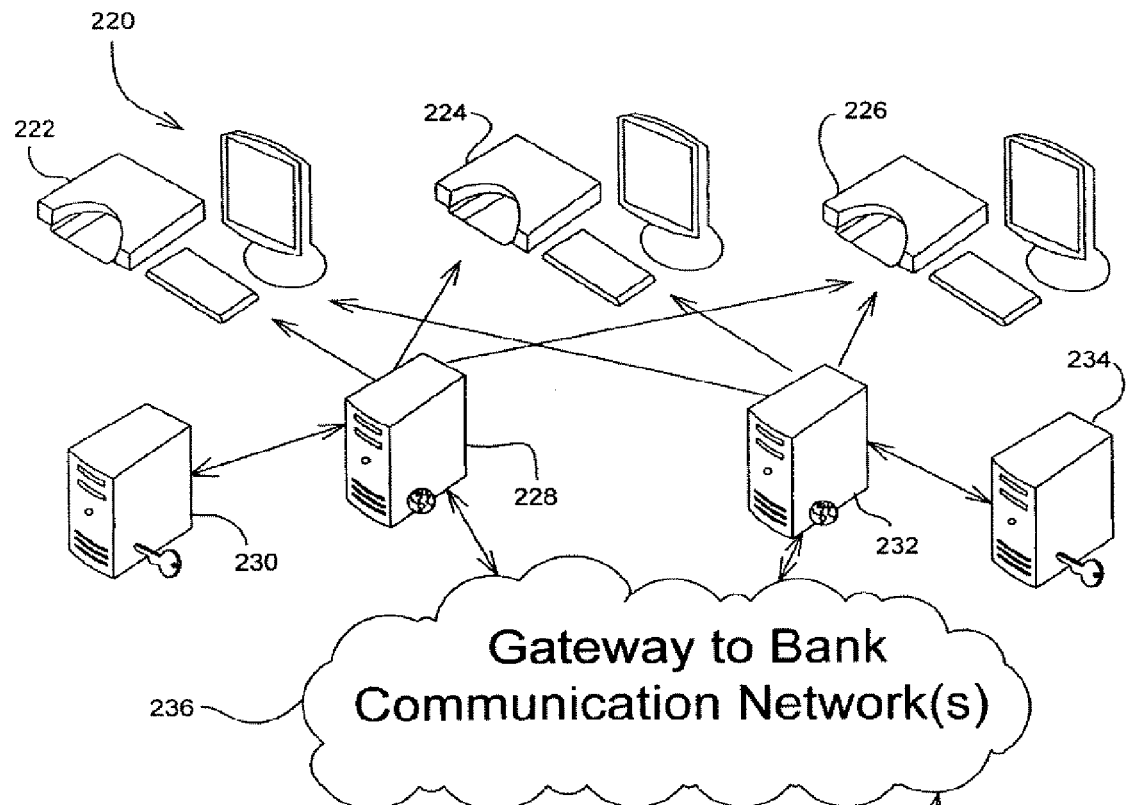
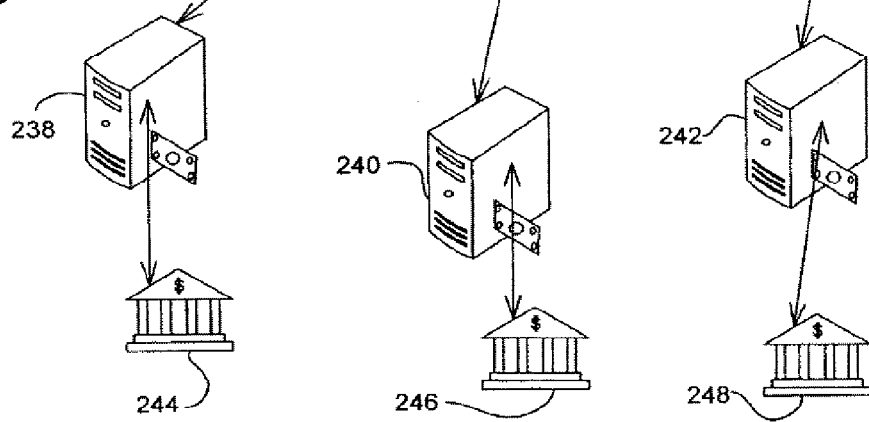
Fig. 24

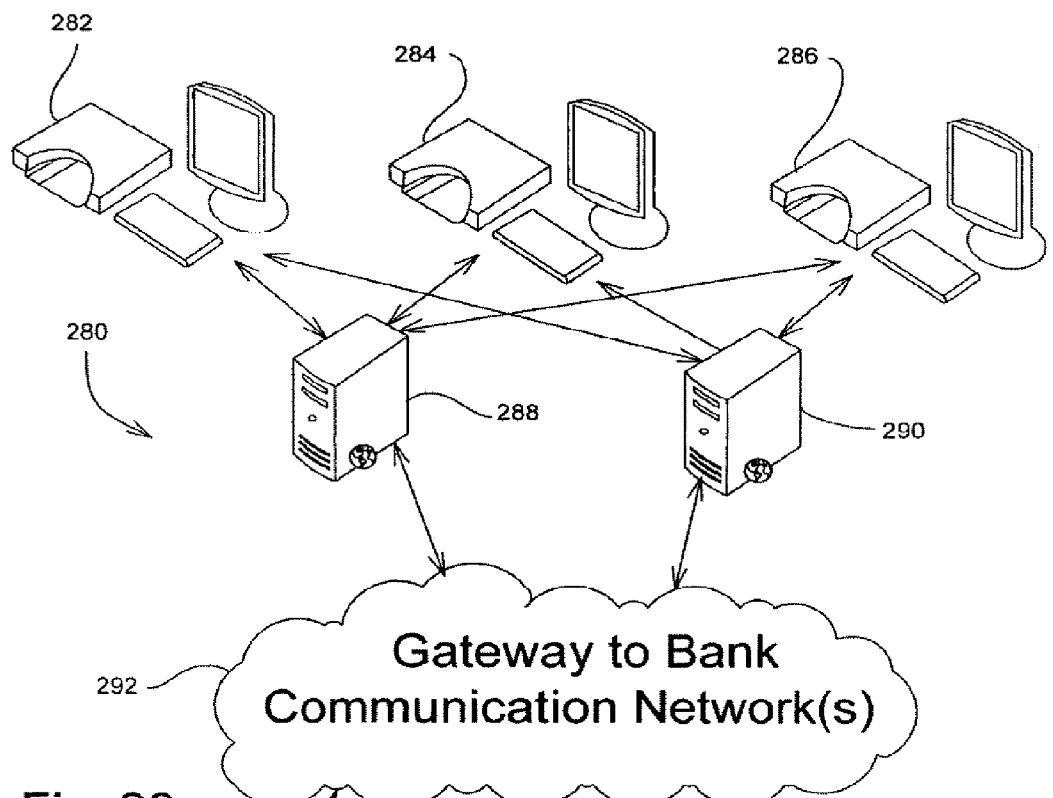
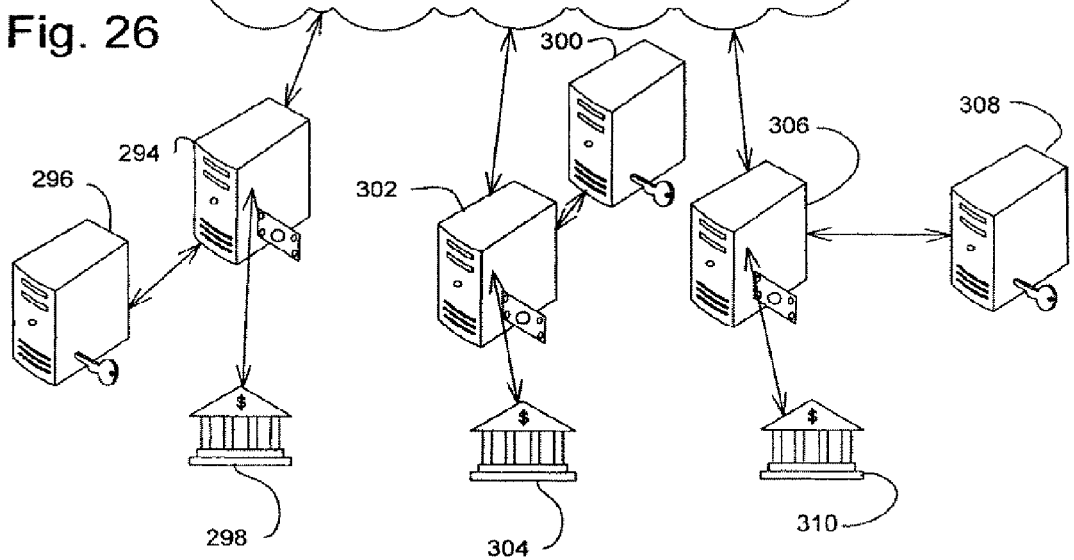
Fig. 26

TRANSPARENTLY SECURING DATA FOR TRANSMISSION ON FINANCIAL NETWORKS

CROSS-REFERENCE TO RELATED APPLICATIONS

This application is a continuation of U.S. patent application Ser. No. 11/127,862, filed on May 12, 2005, now issued as U.S. Pat. No. 7,506,812, which is a continuation-in-part of U.S. patent application Ser. No. 10/936,359, filed on Sep. 7, 2004, now issued as U.S. Pat. No. 7,309,012, each of which is herein incorporated by reference in its entirety.

BACKGROUND OF THE INVENTION

1. Field of the Invention

The present invention relates to a method for protecting magnetic stripe data in transit from the magnetic stripe reader to a host computer while maintaining compatibility with the data format contained within the magnetic stripe data. The present invention further relates to a magnetic stripe reader assembly which replaces the magnetic head in conventional point of sale terminals (POS) which encrypts the magnetic stripe information within the magnetic head preventing unauthorized access to said information. More particularly, the present invention relates to a secure magnetic stripe reader attachable to a POS or handheld computing device which enables the secure reading and writing of information on a single or multiple track magnetic stripe by encrypting the card data prior to entering the POS or PDA in a format transparent to the devices normal operation.

2. Description of the Related Art

Cards which have a magnetic stripe attached thereto are ubiquitous in modern society today. That is, nearly everyone carries one of the following cards, each of which typically have a magnetic stripe attached thereto: credit cards, bank cards, automatic teller machines cards (ATM cards), debit cards, identification cards, drivers licenses, security access cards, check cashing cards, etc.

The necessity and usefulness of devices which decode the information on such cards are well known. The need to read and decode and save the information on such cards using low cost and portable computing devices including PDA's and cell phones has become increasingly evident in recent months. One such application is in reading the custom formats used in US state driver's licenses. To date, forged drivers licenses used to purchase alcohol and tobacco do not contain correctly encoded data on the attached magnetic stripe. The described invention can be used to read the various formats in use by various US state's department of motor vehicles and display the physical description recorded on the magnetic stripe. Liquor stores, bars, and law enforcement agencies can use this portable system to determine the authenticity of the identification cards being used to purchase controlled substances. One benefit of the current invention over previous art is the increased security of the device and the information transferred. In the age verification application, only the information necessary for the user identification is output from the head in a readable format. Other data such as the driver's license number is output in an encrypted format and stored for later verification of the identifications acceptance if required by law enforcement agencies.

Another application in using MSR card reader attachments with handheld computing devices such as PDA's and cell phones, is to process credit card and debit card transactions. In these applications, the wireless and movable nature of the POS transaction makes security a requirement. If clear text of the card data is allowed to enter the handheld, a virus or "Trojan horse" program could capture the data to compromise the card holder's monetary accounts. Card skimming, which is the illegal recording and use of credit/debit card information to make fraudulent purchases, currently represents approximately 25% of credit/debit card company losses. This number is expected to increase to over a billion dollars in the future. In spite or long standing regulations that no track data be stored by POS terminals, transaction processing gateways, or merchants in clear text formats it is common knowledge that this data is stored and has been compromised. Millions of credit and debit cards magnetic stripe data has been stolen from these sources and used to transact fraudulent transactions. The major credit and debit card brands have enacted new regulations in an attempt to curb availability of the magnetic stripe data. Unfortunately compliance to these new regulations could require replacing all POS terminals deployed. With millions of POS terminal in use the cost to the merchants for upgrading POS equipment to comply with the new regulations is prohibitive.

With one implementation of the current invention selected card track data is encrypted during the reading of the magnetic stripe with a format as described in hidden des standard data format drawing. The combination of clear text track data and the encrypted track data which is output from the reader has the same track data format as read from the card which allows legacy POS equipment to function without modification. After the encrypted data is sent to the processing bank via various secure and insecure networks the required keys are used to decrypt and reconstruct the original magnetic stripe data and format of the card data for processing. The output being encrypted as required by the major brands provides for adherence to the new regulations without replacing the POS equipment.

In another implementation of the current invention selected card track data is encrypted during the manufacturing of the card with a format as described in hidden des standard data format drawing. The data written to the card is used to generate a one way hash code. This hash code and the encryption key used to encode the data are stored in a secure database for future use in decrypting the card data. As with other embodiments of this invention the encrypted card data format is compatible with legacy or the current non encrypted data format currently in use. The clear text information remaining in the stripe data is sufficient for legacy POS equipment to perform is current tasks without changing the current applications or infrastructure. After the encrypted data is sent to the processing bank via various secure and insecure networks the required keys are used to decrypt and reconstruct the original magnetic stripe data and format of the card data for processing. It should be noted that this application and the former where that card data is encrypted in the MSR are cross compatible and there would be benefit in using both techniques together. Encrypting the data in the reader attaches reader and POS information to the card while encrypting during manufacturing prevents standard card readers from reading and storing the data for illicit uses.

In addition to providing a low power, secure intelligent magnetic stripe reader for handheld computing application this invention can be used in legacy products to provide the additional security required in today's POS markets. The modules intelligent interface can be configured to various digital interfaces such as SPI, I2C, or serial TTL which are supported by the legacy equipment currently in use. In addition, the module can mimic the output of a conventional head providing encrypted data to the legacy equipment. In addition the module can output using new protocols such as Bluetooth.

Current wired and wireless transaction processing servers rely on whatever the networks "end to end" security is for protecting credit and debit card transactions. In many applications, the network is secure from the transaction terminal to the processing banks server. In some applications, most noticeably the use of cell phone and other handheld computing devices as the POS transaction terminal, the security provided by the network is less than ideal. WAP based transaction processing is subject to the security implementation provided by the wireless carrier. In the case of one such wireless provider, Nextel®, the encryption and hence the security of the data varies from clear text to 56 bit DES to 128 bit TDES. While the TDES meets the card industry standards for security, the others do not, which makes it impossible to guarantee end to end strong encryption of at least the TDES level. The present invention supports strong end to end encryption along with the ability to interface to banks legacy transaction processing systems and to in addition verify the cards authenticity.

SUMMARY OF THE INVENTION

According to one or more embodiments of the invention, various features and functionality can be provided to enable or otherwise facilitate various forms of token transactions. Particularly, in accordance with one aspect of the invention, data security techniques such as, for example, token encryption is performed in such a way that a modulo arithmetic check will not be able to detect the difference between the encrypted or modified data string and the original data string.

In one embodiment of the present invention, a method for processing token data for a transaction includes: receiving a string of first token data from a token at a token reader; modifying the first token data and generating second token data, the second token data including modified token data; performing a mod 10 operation on the second token data and determining a mod 10 cheek digit that will cause a modulo arithmetic check of the second token data to yield the same result as the modulo arithmetic check would yield on the first token data; and inserting the mod 10 check digit in the second data string and forwarding the second data string for the transaction.

In one embodiment, the second token data may be a string of modified token data and clear text token data assembled in the same format as the first token data. The portion of the token data may be an account number data from first the token data. In the method described above, the mod 10 check digit may he appended to the second string or replaces a character in the second string. The mod 10 check digit can also be added to the first data string at a predetermined location of the first data string. The predetermined location can he one position prior to the last four digits of an account number.

In yet another embodiment, the method further comprises converting the modified token data to a base 10 number prior to generating the second token data. The token can be a bank card and the token data may include card track data. The token can also be a bank card account number PAN (personal account number) and the token data may include modified PAN digits.

In still yet another embodiment, the modifying procedure comprises converting the first token data to eight bytes, and performing an eight-byte triple DES encryption on the converted token data.

In still yet another embodiment, the procedures of modifying the first token data and generating second token data include: converting X digits of the first token data to a predetermined number of Y bytes; performing a Y-byte encryption on the converted token data; and converting the encrypted Y bytes of encrypted data to X digits.

In still yet another embodiment, the procedures of performing the mod 10 operation and inserting the mod 10 check digit may comprise performing a mod 10 calculation on the X digits to determine the mod 10 check digit and inserting the mod 10 check digit in the appended predetermined digit location. The token data that is encrypted can be a subset of the original token data string, and the encrypted token data may replace the original token data at the same location or locations in the string.

In accordance with another embodiment of the present invention, a method for processing bank card data for a purchase transaction includes: receiving a first set of bank card data from a card reader; encrypting selected characters of the card data; replacing the original selected characters of the card data with the encrypted selected characters of the card data creating a second set of card data; performing a modulo arithmetic calculation on the second set of card data and determining a mod 10 check digit that will cause a modulo arithmetic check of the second set to yield the same result as the modulo arithmetic check would yield on the first set of bank card data; and inserting the mod 10 check digit in the second data set and forwarding the second data set for the purchase transaction.

In one embodiment, the second set of card data set may be a string of encrypted card data and original unencrypted card data assembled in the same format as the first set of bank card data. The mod 10 check digit may be appended to the second set of card data or may replace a character in the second set of card data. The mod 10 check digit can added to the second set of card data at a predetermined location of the second set of card data. In another embodiment, the mod 10 check digit is added to the second data string at a predetermined location of the second data string and an original mod 10 check digit in the first string remains unchanged in the second data string.

The predetermined location can be one position prior to the last four digits of an account number. The first set of token data can be track data from a track of the bank card. Additionally, the first set of token data can be PAN data from a bank card.

In another embodiment, the procedure of encrypting selected characters includes converting the selected characters to eight bytes, and performing an triple DES encryption on the selected token data.

In yet another embodiment, the procedures of the encrypting selected characters comprises and creating a second set of card data include: converting X digits of the first set of bank card to a predetermined number of Y bytes; performing a Y-byte encryption on the converted card data; and converting the encrypted Y bytes of encrypted data to X digits. The procedure of performing the mod 10 operation and inserting the mod 10 check digit may comprise performing a modulo calculation on the X digits to determine the mod 10 check digit and inserting the mod 10 check digit in the appended predetermined digit. The token data that is encrypted can be a subset of the original token data string, and the encrypted token data may replace the original token data at the same location or locations in the string.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is an exploded view of the component parts of a secure magnetic transducer head module, constructed in accordance with the present invention;

FIG. 2 is a partially exploded view of a secure magnetic transducer head module, constructed in accordance with the present invention;

FIG. 3 is a perspective view of an assembled secure magnetic transducer head module attached to a card reader slot component, constructed in accordance with the present invention;

FIG. 4 is a flow diagram illustrating the standard data output format from a standard secure transducer head module, constructed in accordance with the present invention;

FIG. 6 is a side elevation view of a cell phone including an attached manual magnetic stripe card reader, constructed in accordance with the present invention;

FIG. 7 is a front view of a cell phone including an attached manual magnetic stripe card reader, constructed in accordance with the present invention;

FIG. 8 is a bottom side view of a cell phone including an attached manual magnetic stripe card reader, constructed in accordance with the present invention;

FIG. 9 is a top and side perspective view of a cell phone including an attached manual magnetic stripe card reader, constructed in accordance with the present invention;

FIG. 10 is a perspective front and side view of a secure transducer head module attached to a reconfigurable processor/memory module debugger, constructed in accordance with the present invention;

FIG. 24 is a flow chart illustrating the enhanced data output format from an encrypted secure MSR transducer head at a point of sale (POS), in communication with a gateway which decrypts the card data and forwards the data to bank using secure data communication networks, constructed in accordance with the present invention;

FIG. 26 is a flow chart illustrating the enhanced data output format from an encrypted magnetic stripe read at the point of sale (POS), in communication with a gateway which forwards the encrypted data to the bank using and the bank uses previously stored keys to decrypt the card data, as constructed in accordance with the present invention;

DESCRIPTION OF THE PREFERRED EMBODIMENTS

Figure 5:
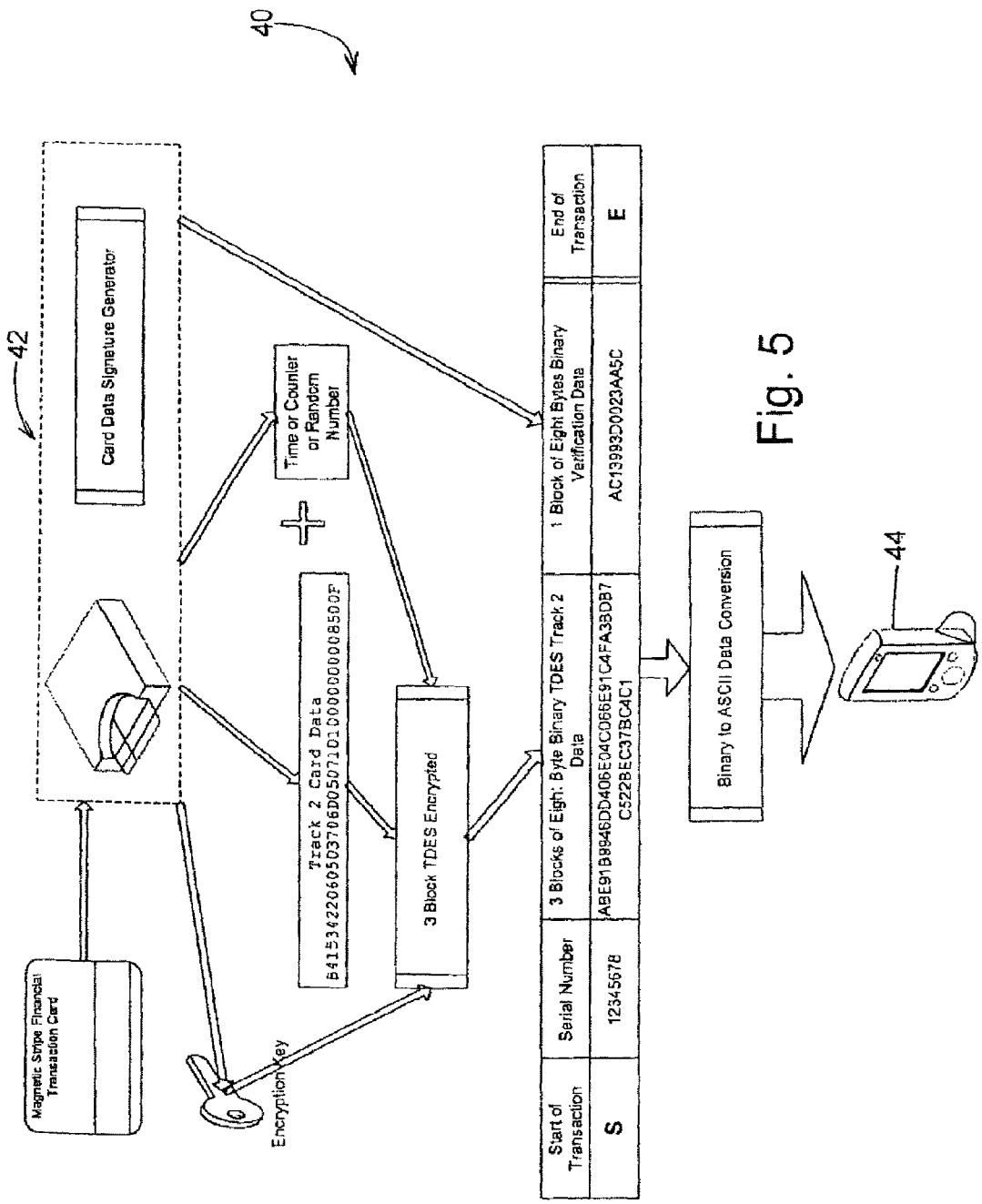
FIG. 5 is a flow diagram illustrating the enhanced data output format from an enhanced secure transducer head module with a card data signature generator, constructed in accordance with the present invention.

Referring now to FIG. 1, there is shown an exploded view of exploded view of a secure head module 10 illustrating the component parts thereof The secure head module 10 is constructed of a protective metal end cap 12, a secure module PCB 14, a magnetic transducer head 16, and an interconnect flex circuit 18. The partially assembled secure head module 22 is attached to the interconnect flex circuit 18 prior to being affixed within the low jitter spring 24.

Referring now to FIG. 2, there is shown a partially exploded view of an assembled secure head module 26 with an interconnect flex circuit 18 (attached), and a low jitter spring 24.

Referring now to FIG. 3, there is shown a perspective view of an assembled secure head magnetic stripe card reader (MSR) 20 having a secure head module 26, wherein said secure head module 26 with interconnect flex circuit 18 is mounted within a card reader housing 28, and thereby ready to be incorporated into existing card reader units for the purpose of practicing the present invention and allowing for enhanced secure card reading transactions and communications.

Referring now to FIG. 4, there is shown a flow diagram illustrating the standard data output format from a standard secure transducer head module 30. Information stored on the magnetic stripe card is read by card reader 32, encrypted, and sent to a handheld computing device 34, such as a cell phone or a PDA.

Referring now to FIG. 5, there is shown a flow diagram illustrating the enhanced data output format 40 from an enhanced secure transducer head module with a card data signature generator 42. Information stored on the magnetic stripe card is read by the card reader with a signature generator 42, encrypted with a card signature added, here as binary verification data, and sent to a handheld computing device 44, such as a cell phone or a PDA. The generated card signature data enables enhanced security during transaction data flow.

Referring now to FIGS. 6, 7, 8 and 9 there is shown a several views of a combination cell phone and manual magnetic stripe card reader 50 comprising a conventional cell phone 52 (here representing any handheld computing device) with an attached magnetic card reader 54. The magnetic card reader 54 is held in place on cell phone 52 by attachment arm 56. The magnetic card reader 54 includes a card slot 58 for swiping the card (not shown) containing data to be read, and an indicator LED 66. The magnetic card reader 54 is electronically linked to cell phone 52 via an HHCD interface connector 62 and communication cable 64, for the purpose of sending and receiving data and to allow the cell phone 52 batteries to power the card reader 54. The communication cable 64 leads to the card reader circuitry housing 68 to provide power and send and receive data. This card reader contains the secure head module (see FIGS. 1 through 3) which is the subject of this patent, and the card reader circuitry housing 68 contains both power management software, and the ability to generate standard and enhanced data formats for secure and enhanced security card transactions.

Referring now to FIG. 10, there is shown a combination secure transducer head module and a reconfigurable processor/memory module debugger 70. The secure transducer head card reader assembly 72 is attached to the reconfigurable processor/memory module debugger 74 via a secure head data and debugger connector cable 78. The connector cable 78 extends from the secure head 76 to a contact point on the printed circuit board (PCB) 86 of the reconfigurable processor/memory module debugger 74. The reconfigurable processor/memory module debugger 74 includes both an external debugger interface connector 82 and a personal computer PC/terminal interface connector 84.

Figure 11:
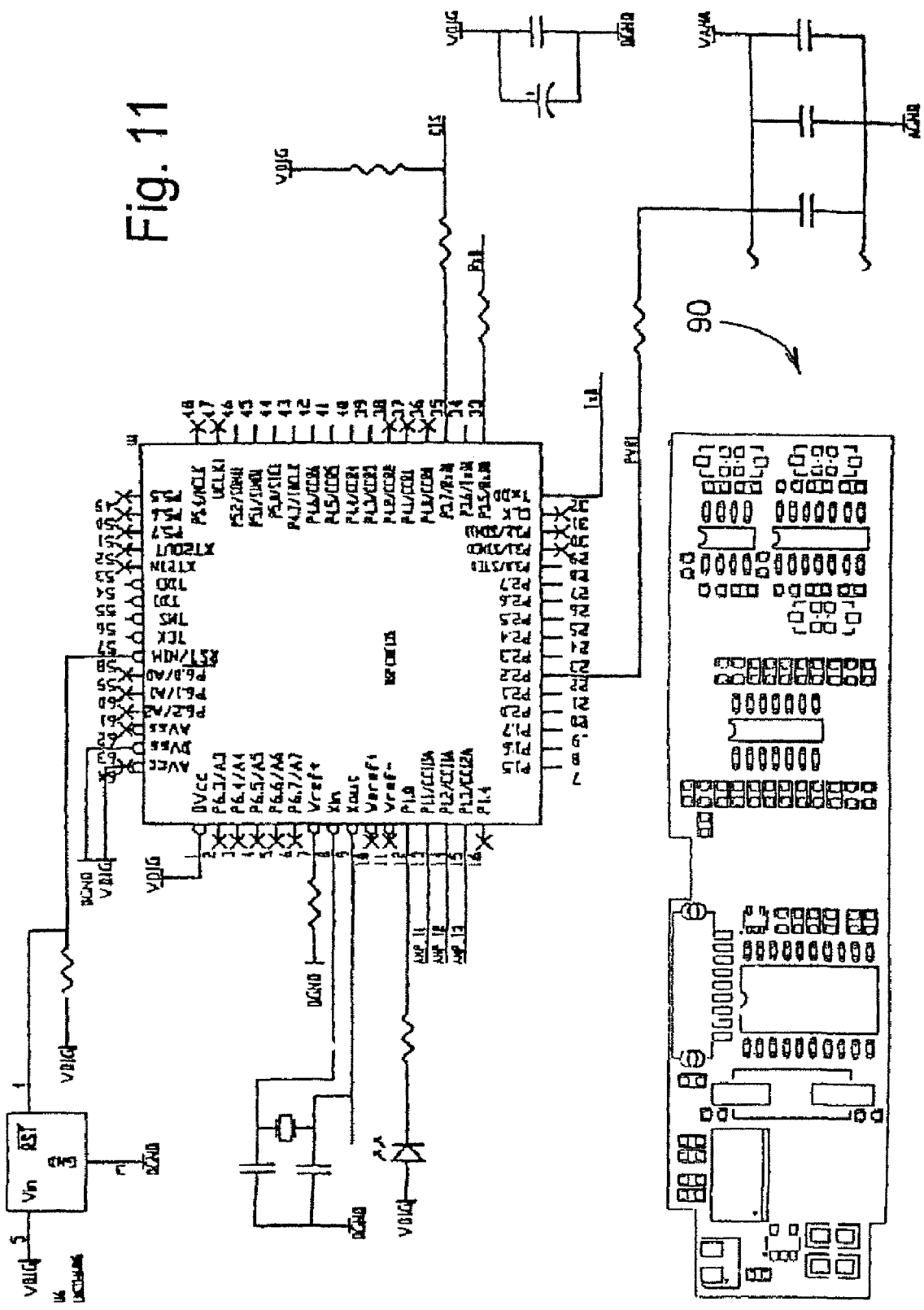
FIG. 11 is a schematic diagram and printed circuit board (PCB) layout diagram of a conventional magnetic stripe card reader, constructed in accordance with the current technology.

Referring now to FIG. 11, there is shown a schematic diagram and printed circuit board (PCB) layout diagram 90 of a conventional magnetic stripe card reader, constructed in accordance with the current technology.

Figure 12:
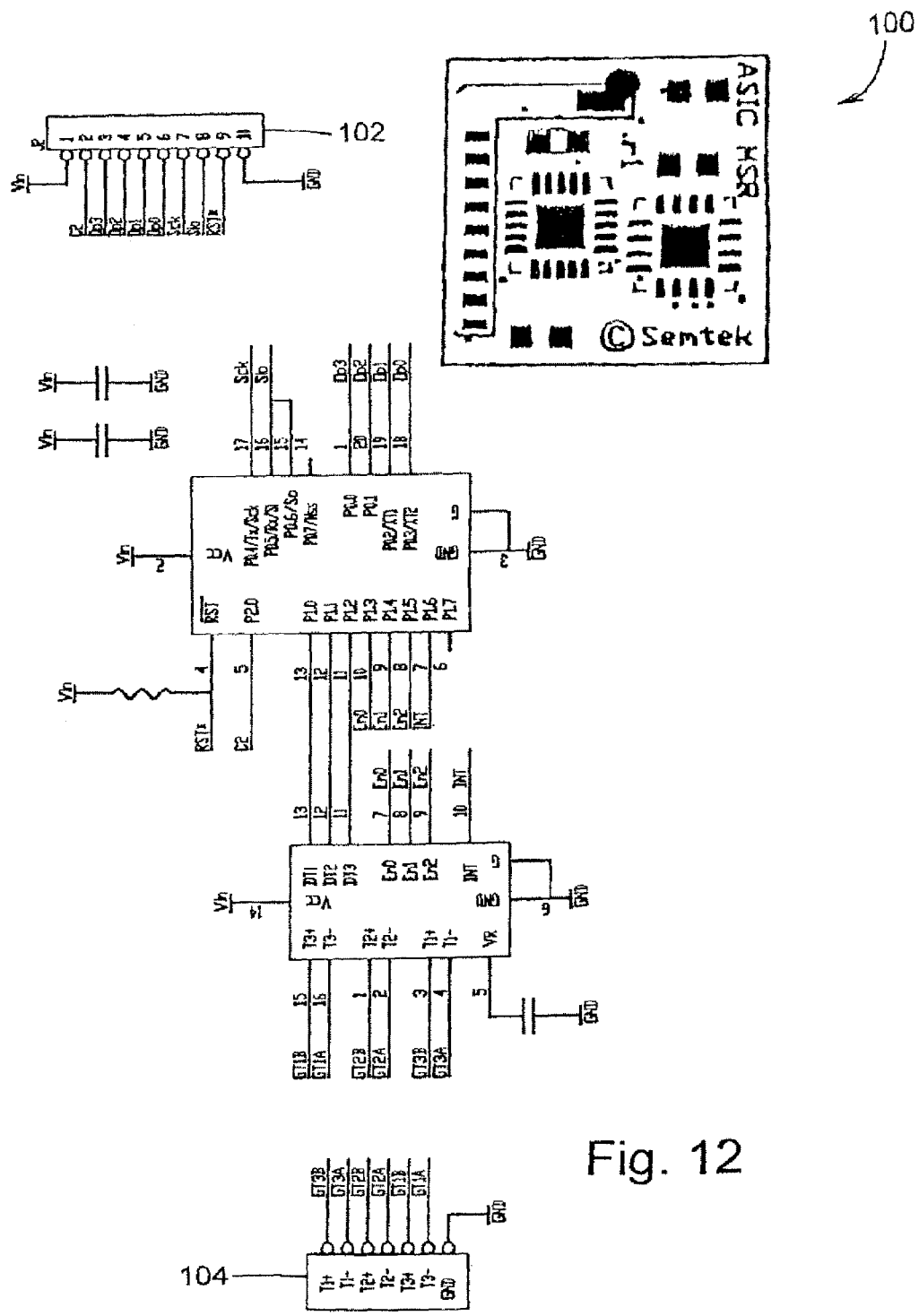
FIG. 12 is a schematic and printed circuit board (PCB) layout of a secure transducer head magnetic stripe card reader, constructed in accordance with the present invention.

Referring now to FIG. 12, there is shown a schematic diagram and printed circuit board (PCB) layout diagram 100 of a secure transducer head magnetic stripe card, constructed in accordance with the present invention. Data and electrical current flow from the magnetic head 104 to the output/control 102.

Figure 13:
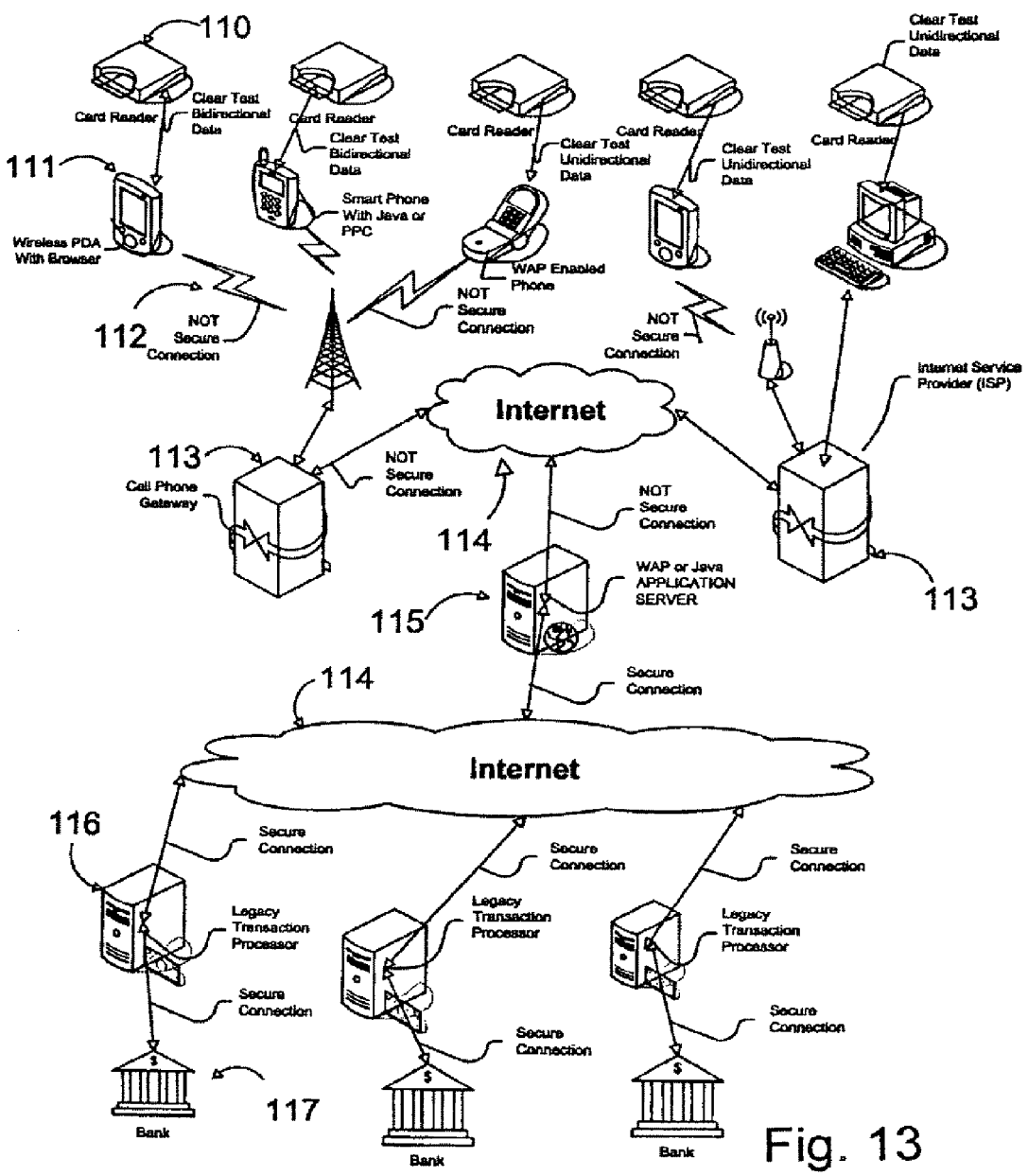
FIG. 13 is a flow chart illustrating the WAP and java application for legacy transaction server support, constructed in accordance with the prior art.

Referring now to FIG. 13, there is shown a flow chart illustrating the WAP and java applications for legacy transaction server support, constructed in accordance with the prior art. These WAP and java applications include unsecured connections between card reader's 110, wireless PDA's 111, smart phones and WAP enabled cell phones and the cell phone gateway over the RF link 112. Also, the links between the Internet 114 and the cell phone gateway 113, and the links between the Internet 114 and WAP or Java application servers 115 is not a secure connection. Thus, here in this wireless legacy system, the only secure connections exist between the Internet, the legacy transaction servers and the individual bank information systems (as shown in the lower half of this flow chart).

Figure 14:
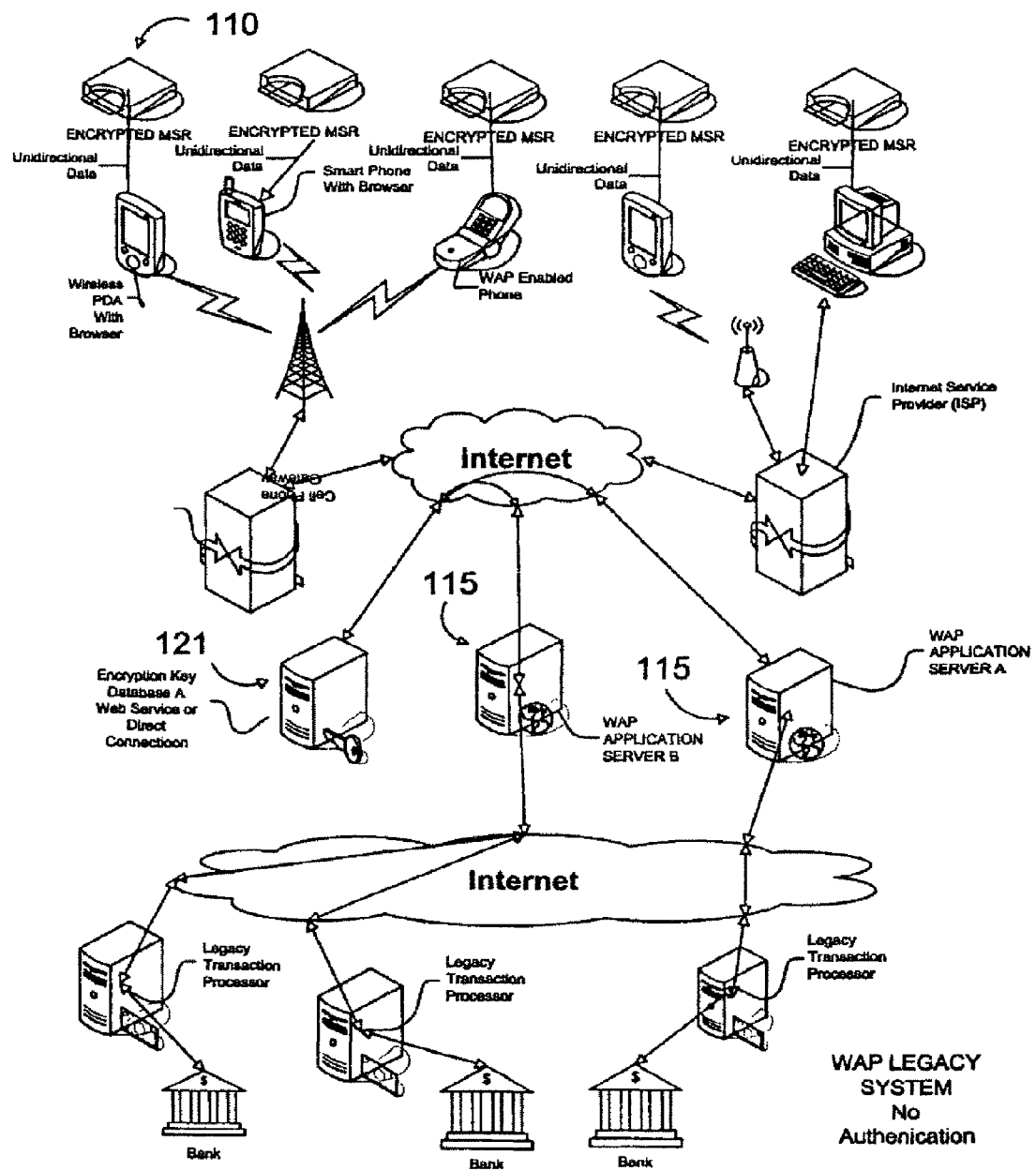
FIG. 14 is a flow chart illustrating the WAP application for legacy transaction server support (with no authentication), constructed in accordance with the present invention.

Referring now to FIG. 14, there is shown a flow chart illustrating the WAP application for legacy transaction server support (with no authentication). The card data is encrypted to CISP compliance at the secure module located inside the card reader 110 using the format indicated in FIG. 4. The encrypted card data is requested by the WAP application server 115 through the Internet 114. The application server requests the encryption key database server or service 121, through the internet 114, to accept the encrypted data and return decrypted transaction data using a secure internet (SSL) connection. The returned decrypted transaction data is formatted by the WAP application server suitable to the required transaction processor as prior to the addition of the secure module.

Figure 15:
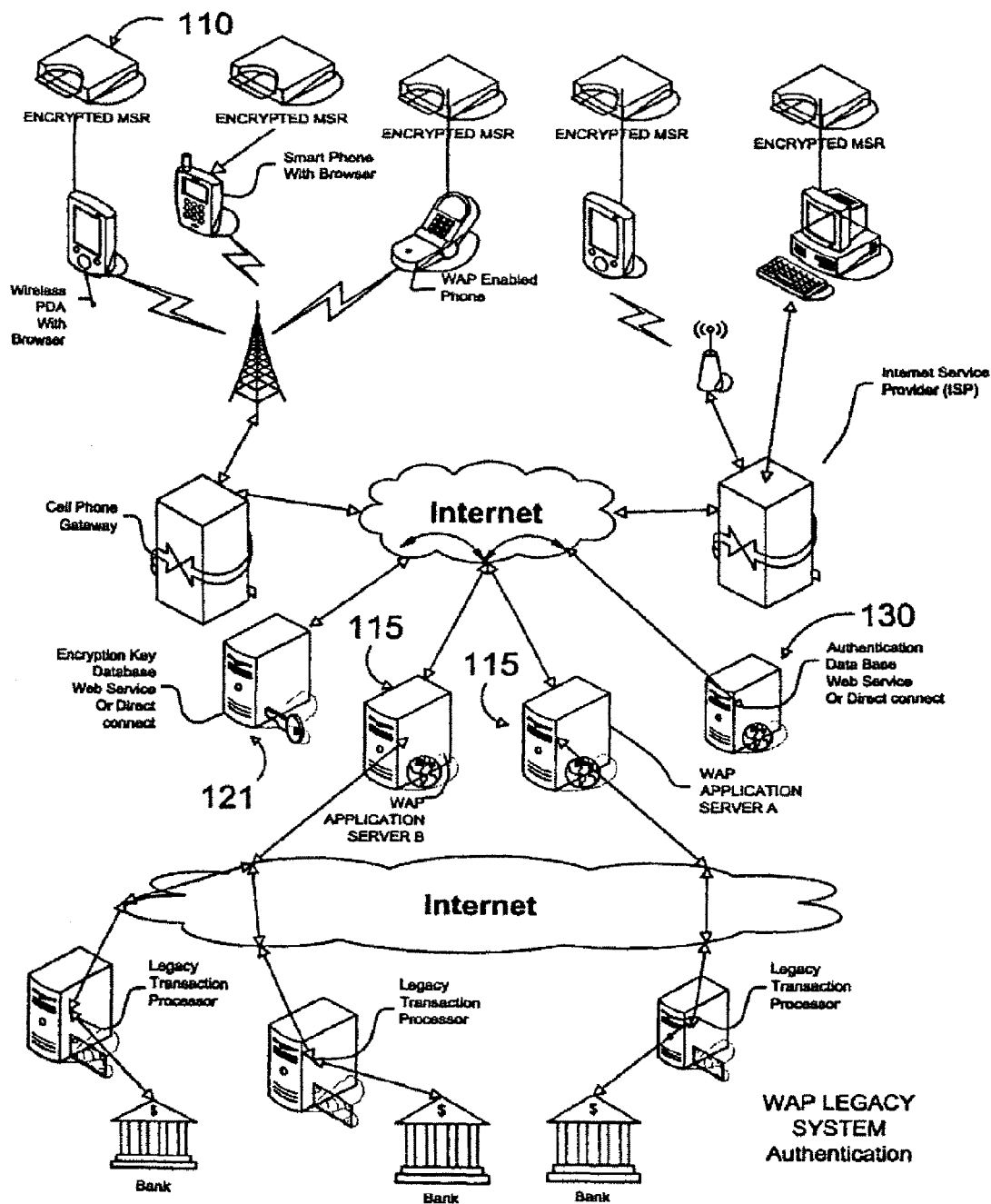
FIG. 15 is a flow chart illustrating the WAP application for a new transaction server support with Secure Stripe® technology employed (authentication), constructed in accordance with the present invention.

Referring now to FIG. 15, there is shown a flow chart illustrating the WAP application for legacy transaction server support with Secure Stripe® technology employed (authentication). The card data is encrypted to CISP compliance at the secure module located inside the card reader 110, additional second block of encrypted data containing the magnetic stripes security signature and a one-way hash code of the card account number using the format indicated in FIG. 5. The encrypted card data is requested by the WAP application server 115. The application server requests the encryption key database server or service 121 to accept the encrypted data and return decrypted transaction data using a secure internet (SSL) connection. The application server requests the Authentication database server or service 130 to verify the magnetic stripe authenticity using the account hash code to index the stored signature value for the magnetic stripe. The results of the signature comparison are used to determine if the card transaction should be terminated or forwarded to the legacy transaction processor based on acceptance rules contained within the encryption database 121.

Figure 16:
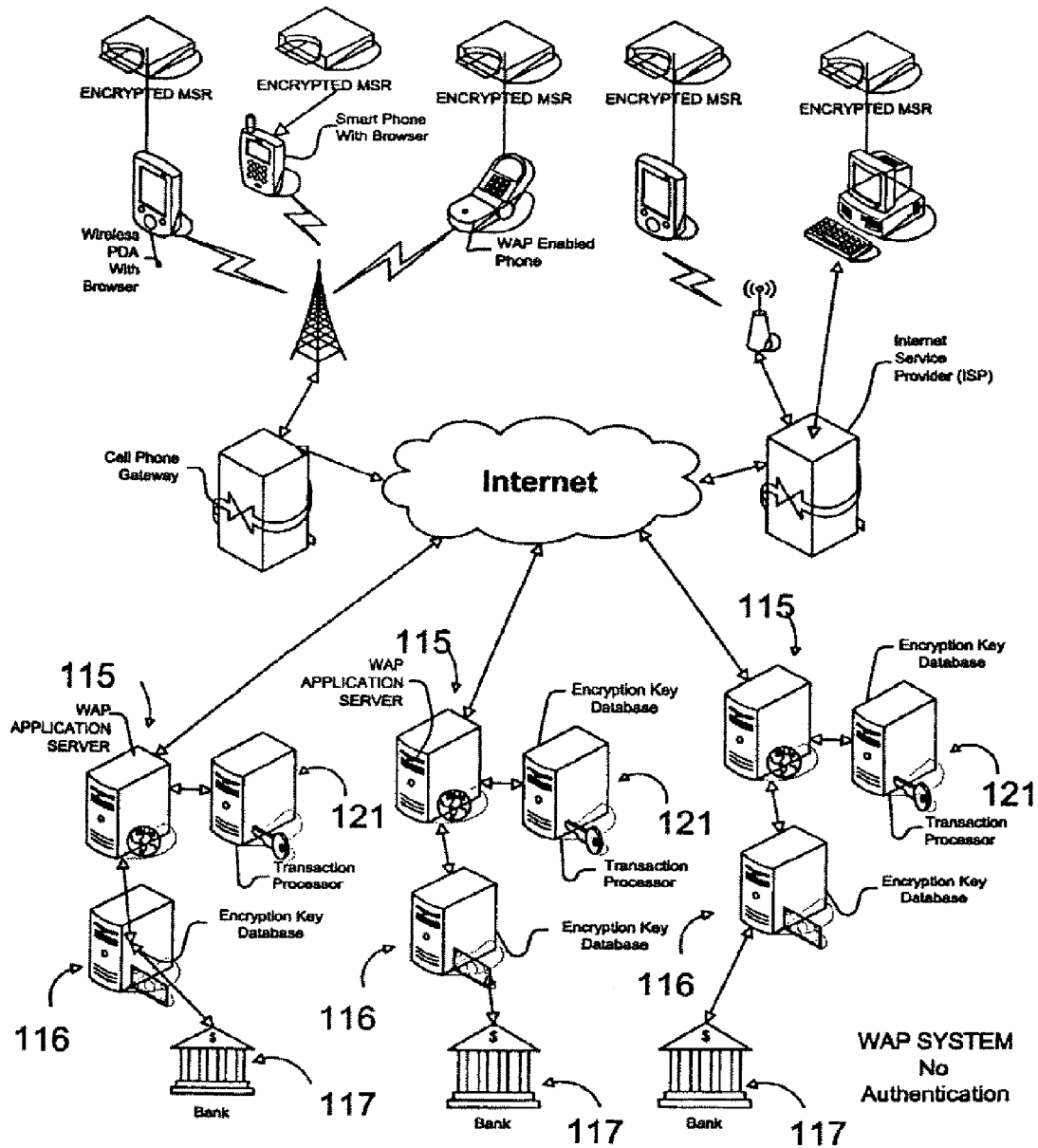
FIG. 16 is a flow chart illustrating the WAP application for a new transaction server (with no authentication), constructed in accordance with the present invention.

Referring now to FIG. 16, there is shown a flow chart illustrating the WAP application for a new transaction server (with no authentication). The card data is encrypted to CISP compliance at the secure module located inside the card reader 110 using the format indicated in FIG. 4. The encrypted card data is requested by the WAP application server 115 through the Internet 114. The application server requests the encryption key database server or service 121, which is located on the same intranet or within the same computer, to accept the encrypted data and return decrypted transaction data. The returned decrypted transaction data is formatted by the WAP application server suitable to the required transaction processor 116 and the transaction processed using current bank rules.

Figure 17:
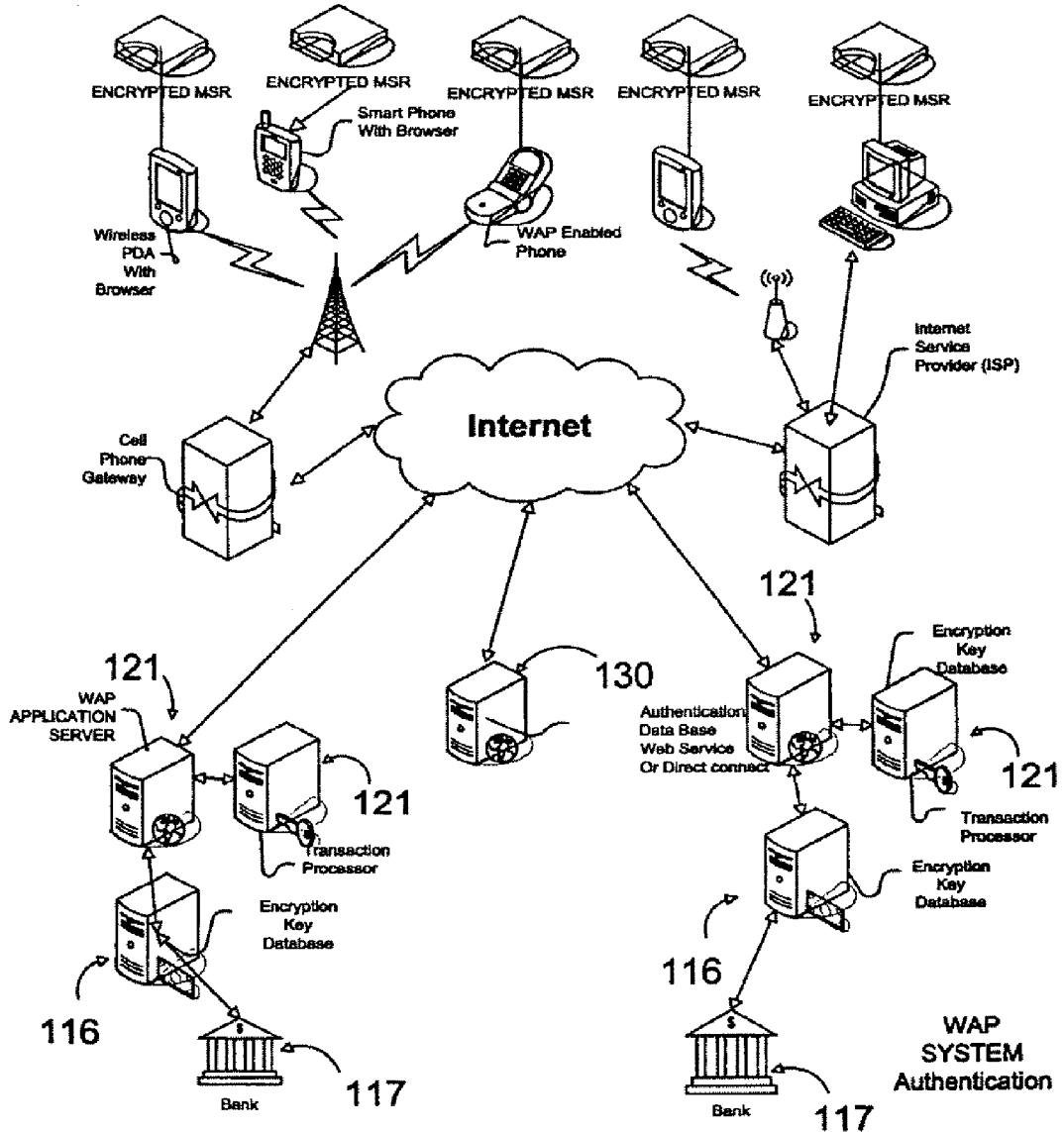
FIG. 17 is a flow chart illustrating the WAP application for a new transaction server (with authentication), constructed in accordance with the present invention.
Figure 18:
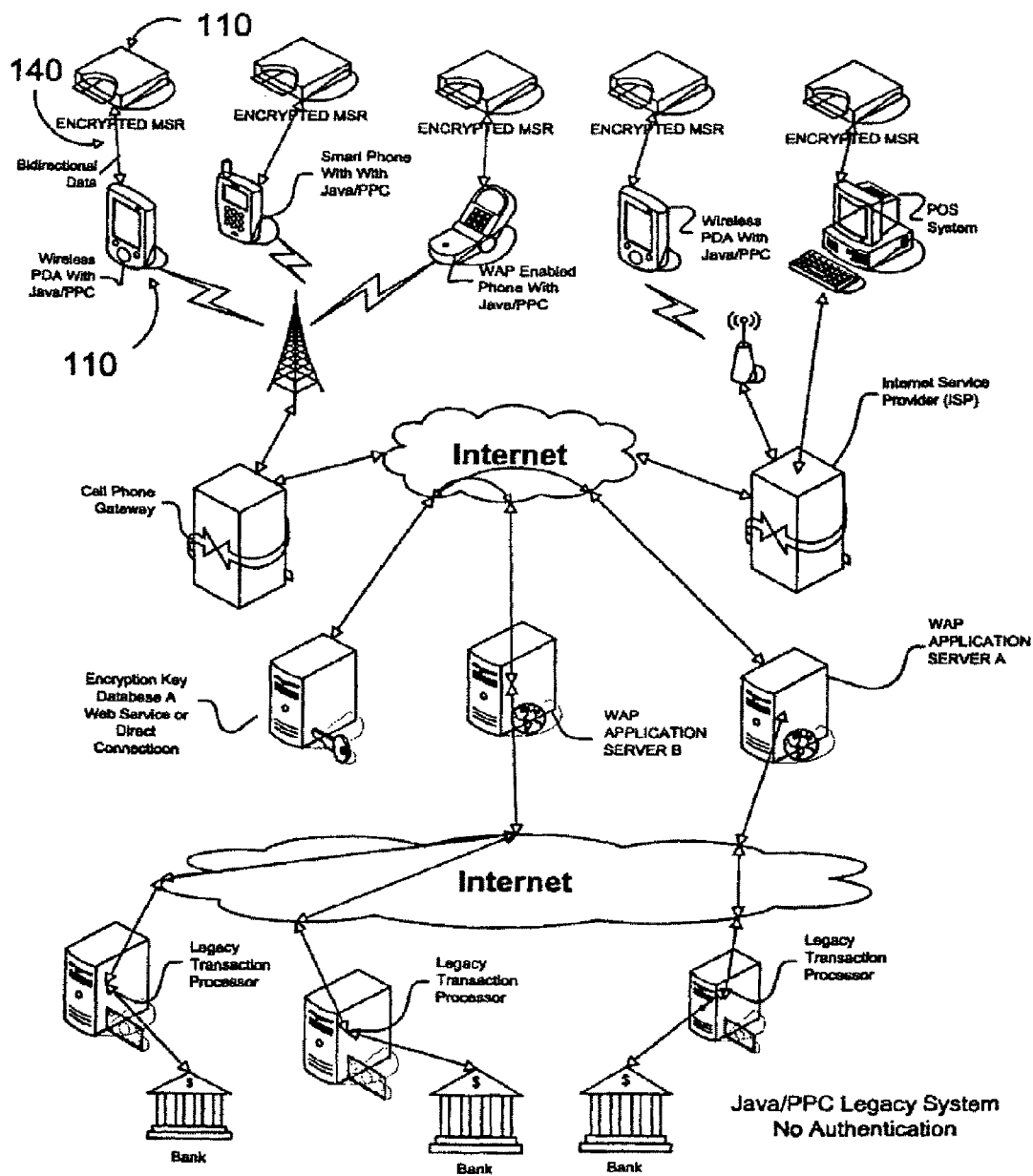
FIG. 18 is a flow chart illustrating the Java®/Pocket PC WAP application for legacy transaction server support (with no authentication), constructed in accordance with the present invention.

Referring now to FIG. 17, there is shown a flow chart illustrating the WAP application for a new transaction server (with authentication). The card data is encrypted to CISP compliance at the secure module located inside the card reader 110 using the format indicated in FIG. 4. The encrypted card data is requested by the WAP application server 115 through the Internet 114. The application server requests the Authentication database server or service 130 to verify the magnetic stripe authenticity using the account hash code to index the stored signature value for the magnetic stripe. The results of the signature comparison are used to determine if the card transaction should be terminated based on current bank rules. The application server requests the encryption key database server or service 121, which is located on the same intranet or within the same computer, to accept the encrypted data and return decrypted transaction data. The returned decrypted transaction data is formatted by the WAP application server suitable to the banks transaction processor 116 and the transaction processed using current bank rules Referring now to FIG. 18, there is shown a flow chart illustrating the Java®/Pocket PC WAP application for legacy transaction server support). While similar to FIG. 14, FIG. 18 supports greater functionality with the addition of bidirectional secure communication 140 between the secure head module 110 and the handheld computing device 111. This added communication channel allows for enhancements not possible using the system of FIG. 14. One primary enhancement is that the secure module can received data from the handheld device to be encrypted along with the card data such as the amount of the transaction. In addition the java or Pocket PC application running in the handheld device can request command and status operations of the secure module without the need for specially encoded cards as required by the WAP systems.

Figure 19:
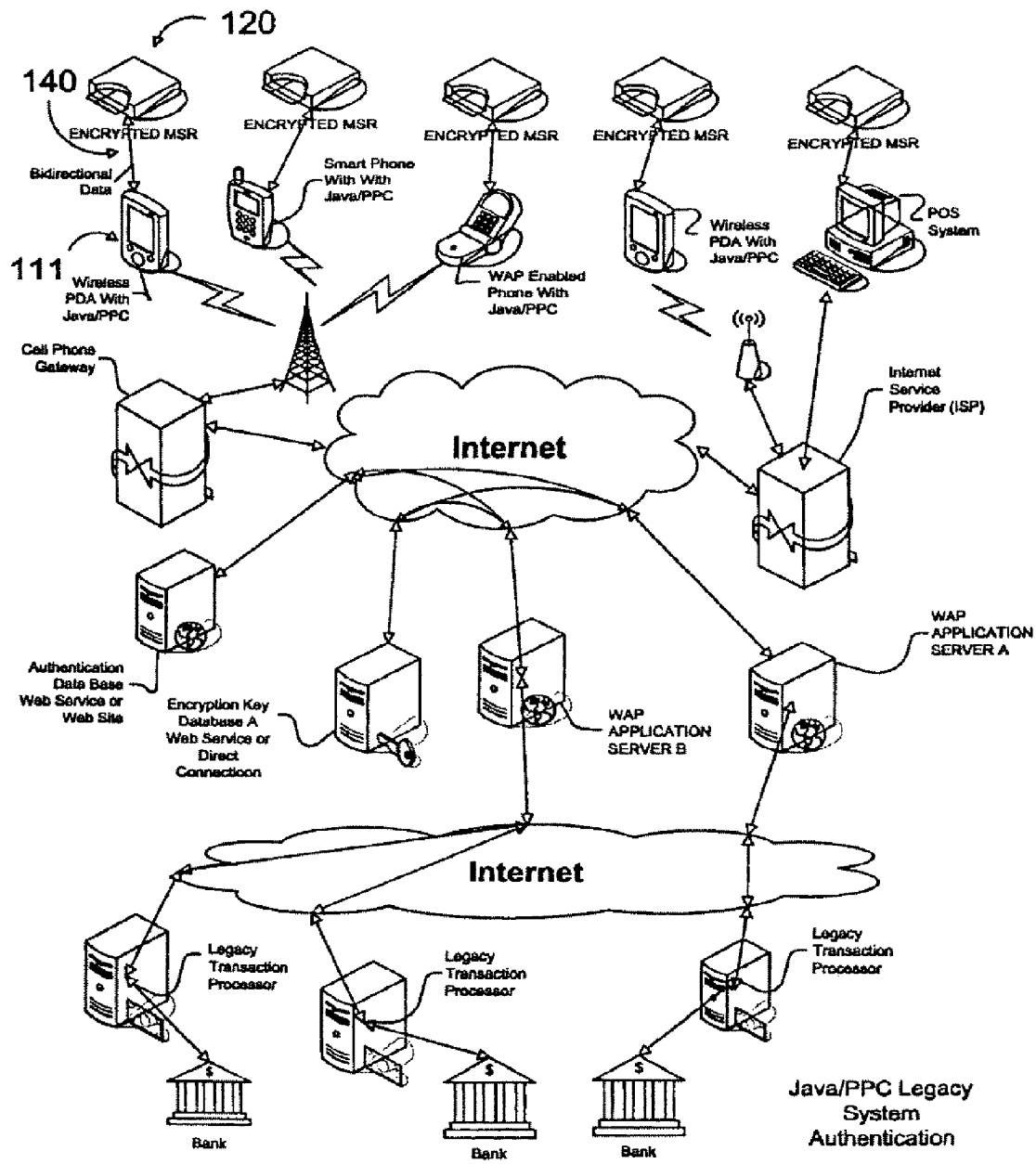
FIG. 19 is a flow chart illustrating the Java®/Pocket PC WAP application for legacy transaction server support with Secure Stripe® technology employed (with authentication), constructed in accordance with the present invention.

Referring now to FIG. 19, there is shown a flow chart illustrating the Java®/Pocket PC WAP application for legacy transaction server support with Secure Stripe® technology employed (authentication). While similar to FIG. 15, FIG. 19 supports greater functionality with the addition of bidirectional secure communication 140 between the secure head module 110 and the handheld computing device 111. This added communication channel allows for enhancements not possible using the system of FIG. 15. One primary enhancement is that the secure module can received data from the handheld device to be encrypted along with the card data such as the amount of the transaction. In addition the Java or Pocket PC application running in the handheld device can request command and status operations of the secure module without the need for specially encoded cards as required by the WAP systems.

Figure 20:
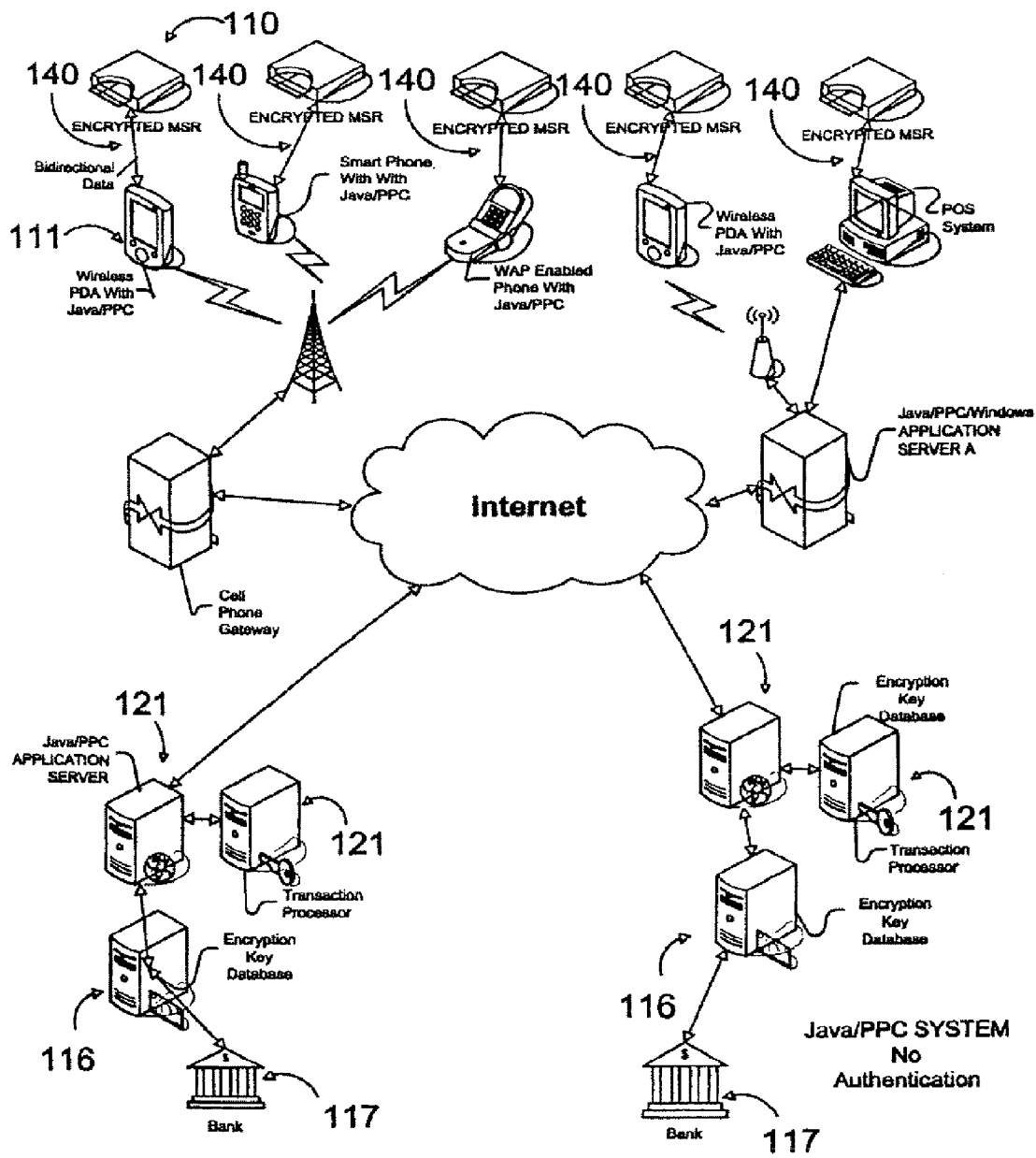
FIG. 20 is a flow chart illustrating the Java®Pocket PC application for new transaction server support (with no authentication), constructed in accordance with the present invention.

Referring now to FIG. 20, there is shown a flow chart illustrating the Java®Pocket PC application for new transaction server support (with no authentication). While similar to FIG. 16, FIG. 20 supports greater functionality with the addition of bidirectional secure communication 140 between the secure head module 110 and the handheld computing device 111. This added communication channel allows for enhancements not possible using the system of FIG. 16. One primary enhancement is that the secure module can received data from the handheld device to be encrypted along with the card data such as the amount of the transaction. In addition the java or Pocket PC application running in the handheld device can request command and status operations of the secure module without the need for specially encoded cards as required by the WAP systems.

Figure 21:
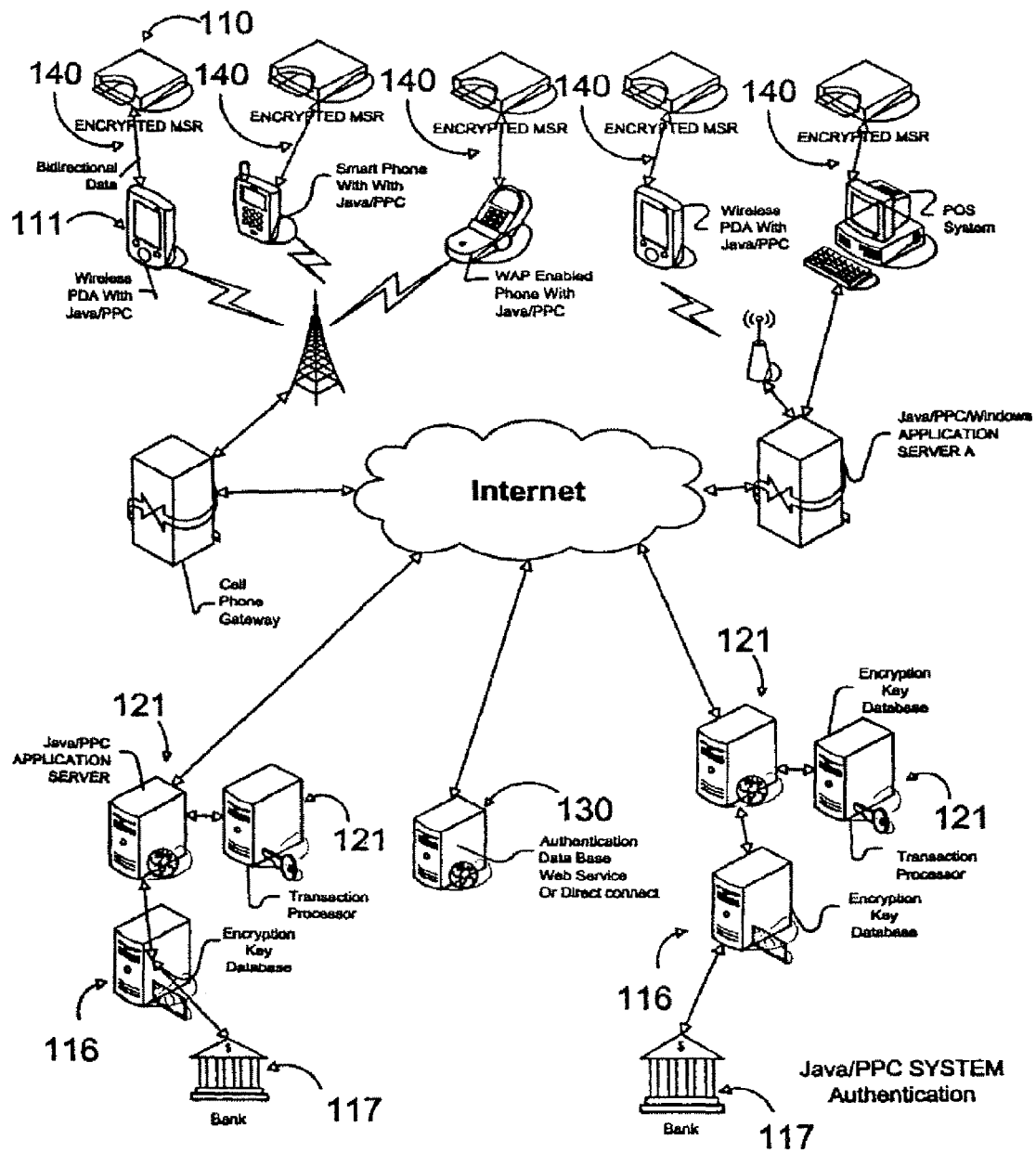
FIG. 21 is a flow chart illustrating the Java®Pocket PC application for new transaction server support with Secure Stripe® technology employed (authentication), constructed in accordance with the present invention.

Referring now to FIG. 21, there is shown a flow chart illustrating the Java®Pocket PC application for new transaction server support with Secure Stripe technology employed (authentication). This system is similar to that illustrated in FIG. 20 above, however, here the wireless PDAs, the cell phone and the point of sale (POS) computer all are equipped with Java®/Pocket PC (PPC) and Java®/Windows XP applications). While similar to FIG. 17, FIG. 21 supports greater functionality with the addition of bidirectional secure communication 140 between the secure head module 110 and the handheld computing device 111. This added communication channel allows for enhancements not possible using the system of FIG. 17. One primary enhancement is that the secure module can received data from the handheld device to be encrypted along with the card data such as the amount of the transaction. In addition the java or Pocket PC application running in the handheld device can request command and status operations of the secure module without the need for specially encoded cards as required by the WAP systems.

Figure 22:
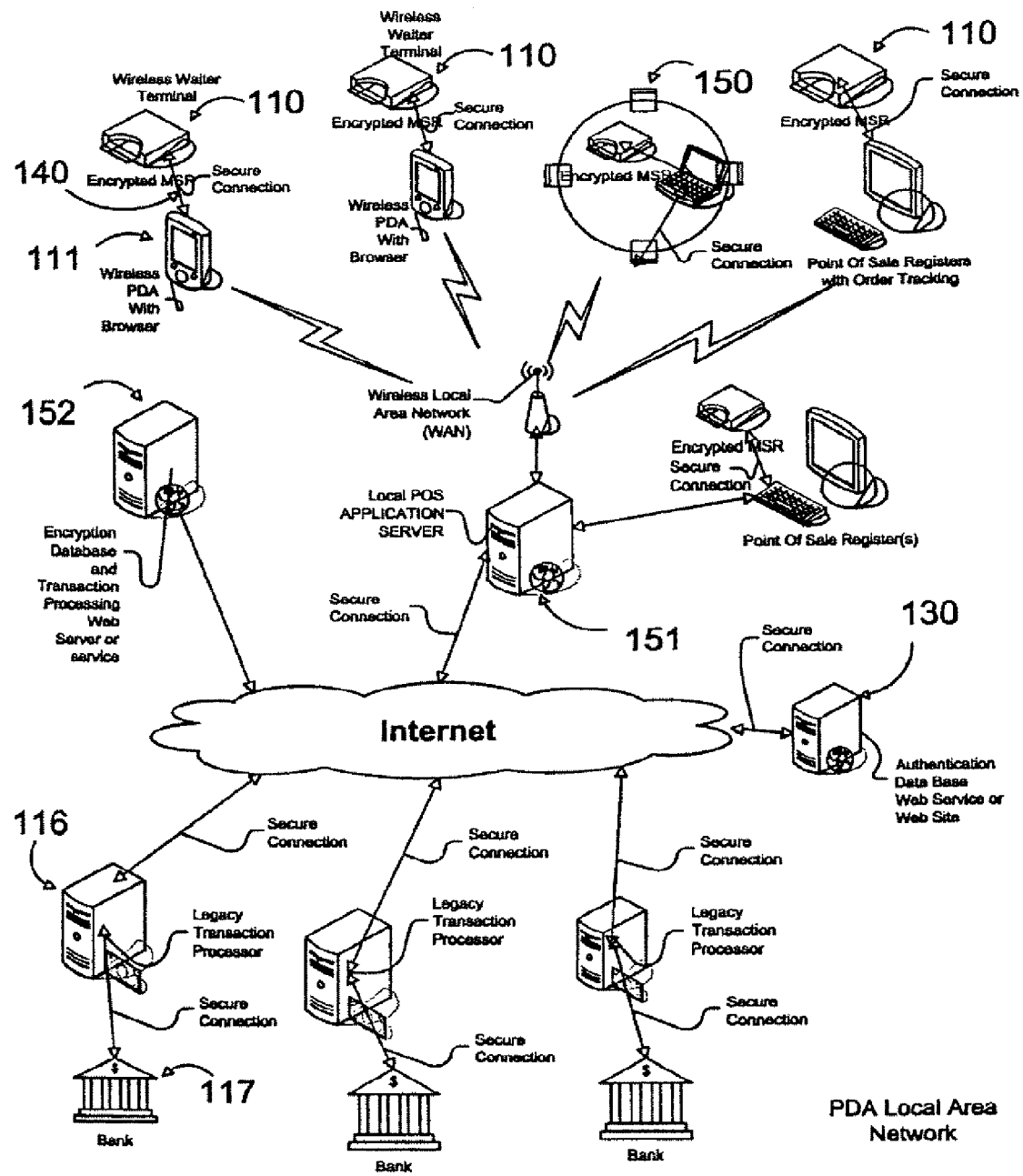
FIG. 22 is a flow chart illustrating a PDA MSR attachment with wireless link and compatible gateway to cell phone application, to access a wireless gateway, constructed in accordance with the present invention.

Referring now to FIG. 22, there is shown a flow chart illustrating a PDA MSR attachment with wireless link and compatible gateway to cell phone application, to access a wireless gateway. Here multiple PDAs 111, table mounted POS terminal with secure module for order entry and payment along with internet access 150, and a point of sale register with wireless capabilities are all connected to a wireless local area network (WAN) 152. This WAN, and any hard wired POS registers communicate with a local POS application server 151 which is connected via the Internet and secure connections to a TDES encryption database and transaction processing server. This TDES encryption database and transaction processing server then communicates via the Internet and secure connections to legacy or new transaction processors which in turn communicate via secure connections with bank information systems. Depending on the transaction processor used the local POS application server either requests the authentication sever to verify the cards authenticity and sends that response along with the encrypted card data to the new transaction server or additionally requests the encryption keys and formats the data for a legacy transaction server. In an alternate method the POS server forwards the encrypted card and signature to an enabled transaction server to both authenticate and decrypt the card data.

Figure 23:
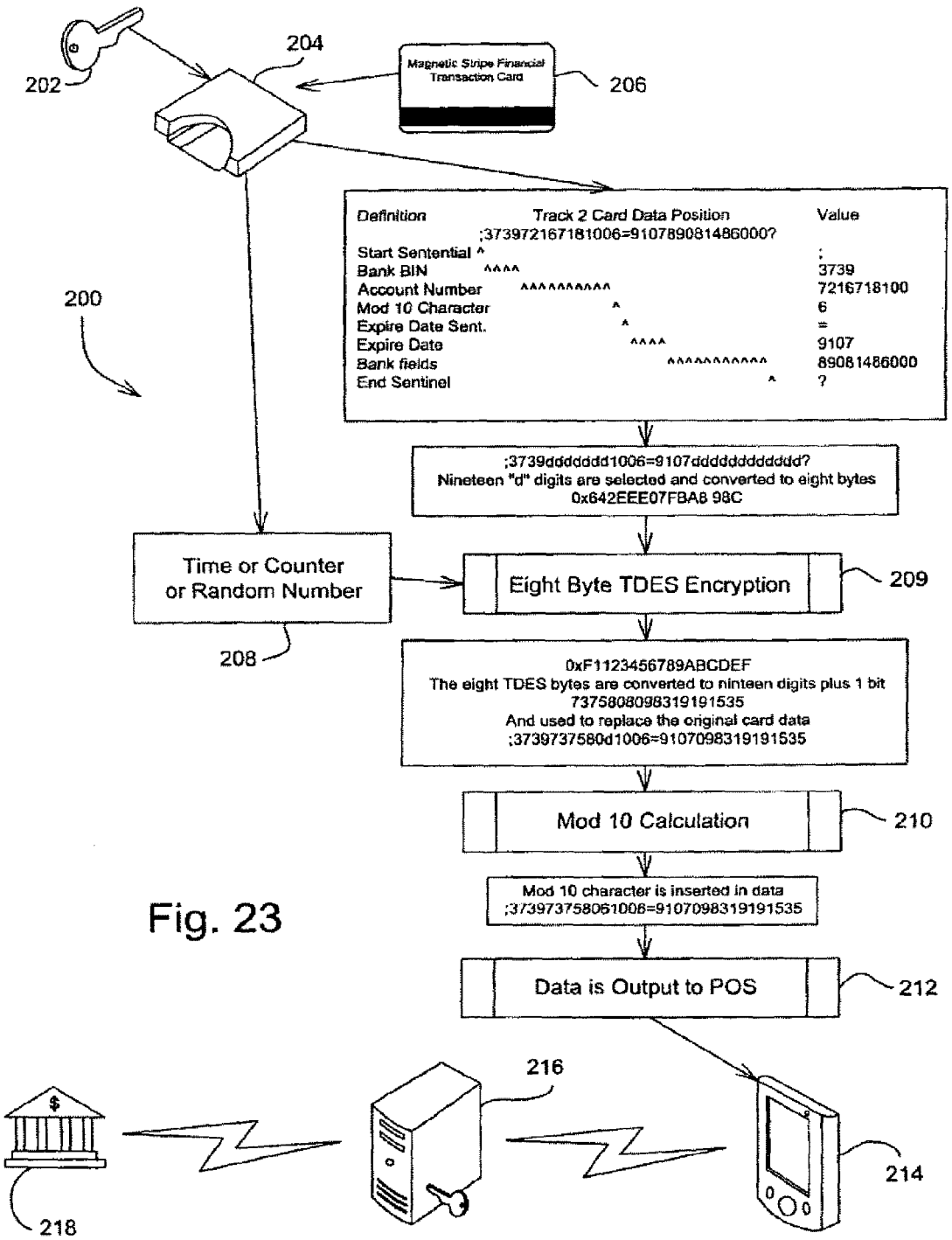
FIG. 23 is a flow diagram illustrating the encrypted and clear text track two credit and debit card data output format from an encrypted secure MSR transducer head compatible with legacy POS terminals as used in accordance with the present invention.

Referring now to FIG. 23, is a flow diagram illustrating the encrypted and clear text track two credit and debit card data output format from an encrypted secure MSR transducer head compatible with legacy POS terminals as used in accordance with the present invention 200, constructed in accordance with the present invention. With the current invention activated, selected card data is encrypted within the magnetic head or card reader 204. Various information from the track data is selected based on particular requirements of the POS system. In general the first for account digits representing the BIN or Bank Identification Number are left as clear text along with the card expiration date and the last four digits of the account number for the POS to use in card verification and receipt printing. Nineteen digits of the remaining card data are converted to an 8 byte binary value, a time function is added 206 and the result TDES encrypted using an electronic code book (ECB) block encryption 209. The 8 bytes of encrypted data are converted to a 20 digit base 10 number, the least significant 19 digits replace the selected card digits. The last digit is 0 or 1 and is added predefined to a bank field. A new mod 10 character is generated 210 and placed into the selected card digit. The combination of encrypted and clear text data output by the secure MSR module and is received by the POS or PDA device 214. The clear text is specific to the application software operating within the POS or PDA 214 allowing normal operation of the device with no or little programming changes. Data sensitive to the application is encrypted while maintaining the format of the original data from the magnetic stripe. After the encrypted data is sent to the processing bank via various secure and insecure networks the required keys are used to decrypt and reconstruct the original magnetic stripe data and format of the card data for processing. In this ways the secure system operates in essentially a transparent fashion, and can be adapted to any existing system already in place or yet to be invented. In an alternative method where the desired number of digits to be encrypted is other than the 19 as described or the encryption block size is larger than the available number of digits to be encoded an output feedback mode (OFB) or the counter mode (CTR) of block encryption may be employed. In these methods fixed data including such variables as the MSR serial number and portions of the clear text card data along with a changing value such as a counter incremented with each block output is encrypted using the desired encryption algorithm. The output bits from the encryption are XORed with the data to be encrypted. In the case that the card digits to be encrypted range for 0 to 9, as commonly found for track 2 data, 3 bits of the encryption are XORed with each digit from 0 through 7. The digits 8 and 9 are left in clear text. Since fewer steps are required for the CTR or OFB method there use may preferred over the ECB method.

In operation, MSR 204 reads the card magnetic stripe data. The data is then "tagged" by taking 19 "d" digits from the track 2 data and converting it to 8 bytes. Using a time or counter or random number generator 208, eight byte triple DES (TDES) encryption is coded using the encryption key stored in the MSR 204, and used to replace the original card 206 track 2 data. A Mod 10 calculation 210 is performed, and the mod 10 character is inserted into the data before data output to a POS 212. A PDA device 214 can then send the encrypted data to a server with an encryption key 216 before sending the original card data on to the designated bank 218.

In operation, the hidden DES system 220 illustrated in FIG. 24, allows for the reading of card data through encrypted MSRs at POS registers, for example a POS register at a store front 222, a POS register at a restaurant 224 and a POS register at an on-line ordering system 226. The read data is transmitted to a POS Gateway 1 228 for banks A and B, and another POS Gateway 2 232 for bank C and others. Each of the POS Gateways has an encryption key server, server 230 for gateway 228, and server 234 for gateway 232. The respective POS gateways then employ the bank communication network or networks to send data along a secure connection to legacy transaction processors 238, 240 and 242, which in turn send financial data to banks A 244, B 246 and bank C 248, via secure connections.

Figure 25:
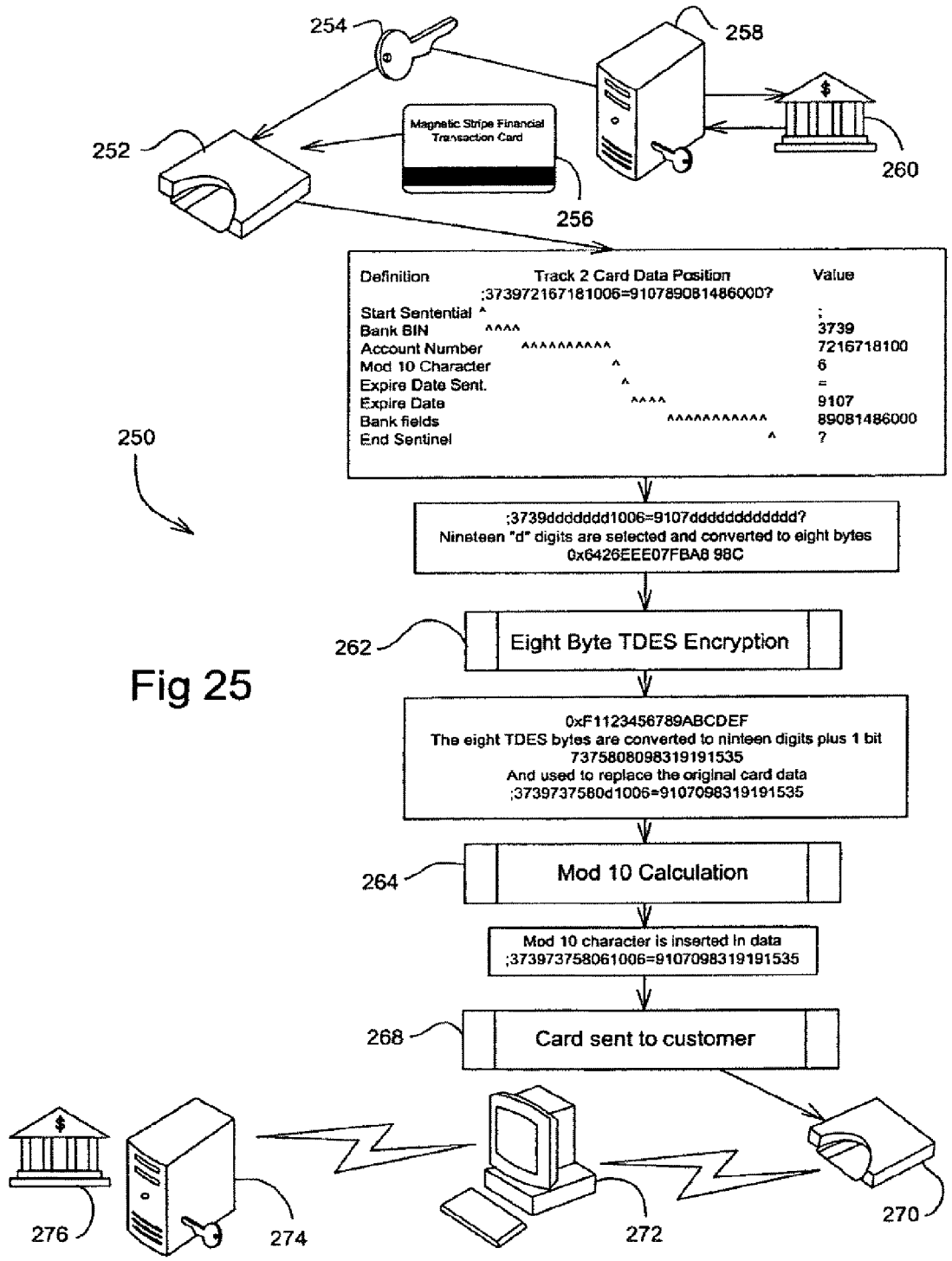
FIG. 25 is a flow diagram illustrating the encrypted and clear text track two credit and debit card data output format from encrypted magnetic stripe data encoded at the cards manufacture and compatible with legacy POS terminals as used in accordance with the present invention.

Referring now to FIGS. 25 and 26, there is shown the present invention in operation using a CPI compliant TDES standard to encode portions of the account data prior to encoding the cards. With the current invention selected card track data is encrypted during the manufacturing of the card. As with other embodiments of this invention the encrypted card data format is compatible with legacy or the current non-encrypted data format currently in use. The clear text information remaining in the stripe data is sufficient for legacy POS equipment to perform is current tasks without changing the current applications or infrastructure. After the encrypted data is sent to the processing bank via various secure and insecure networks the required keys are used to decrypt and reconstruct the original magnetic stripe data and format of the card data for processing. It should be noted that this application and the former where that card data is encrypted in the MSR are cross compatible and there would be significant benefits in using both techniques together. Encrypting the data in the reader attaches reader and POS information to the card while encrypting during manufacturing prevents standard card readers from reading and storing the data for illicit uses.

In operation, the CPI compliant TDES standard data format system 250, illustrated in FIG. 25 enables card manufacturing equipment 252 to receive an encryption key 254 from an encryption key server 258 as administrated by each individual bank, here bank 260, for example. Again, 19 digits are selected from the card's track 2 data position and converted to 8 bytes. An 8 byte triple DES (TDES) encryption engine 262 is used to produce the 8 TDES bytes which are subsequently converted to 19 digits plus 1 bit, and this is used to replace the original card track 2 data. A Mod 10 calculation is performed 264, and the mod 10 character is inserted into the data. At this point the card is custom manufactured for use and is sent to the customer user. When the customer uses the card at a POS terminal 272 the data is readily decrypted and confirmed by the banks key code server 274 and the information sent to associated bank 276.

FIG. 26 illustrates the CPI DES system 280. In operation, encrypted MSRs 282, 284 and 286 representing POS devices located at brick and mortar store fronts, restaurants, on-line ordering systems, etc., send financial data to one of two POS gateways 288 or 290, set up for communications to differing bank systems. Using a gateway to bank communication networks, the gateways 288 and 290 send information via secure connections to legacy transaction processors 294, 300 and 306. Each of the legacy transaction processors has an associated encryption key database relating to an individual bank. Following encryption by each encryption key database, the financial information can be forwarded to each bank 298, 304 and 310 via secure connections.

Figure 27:
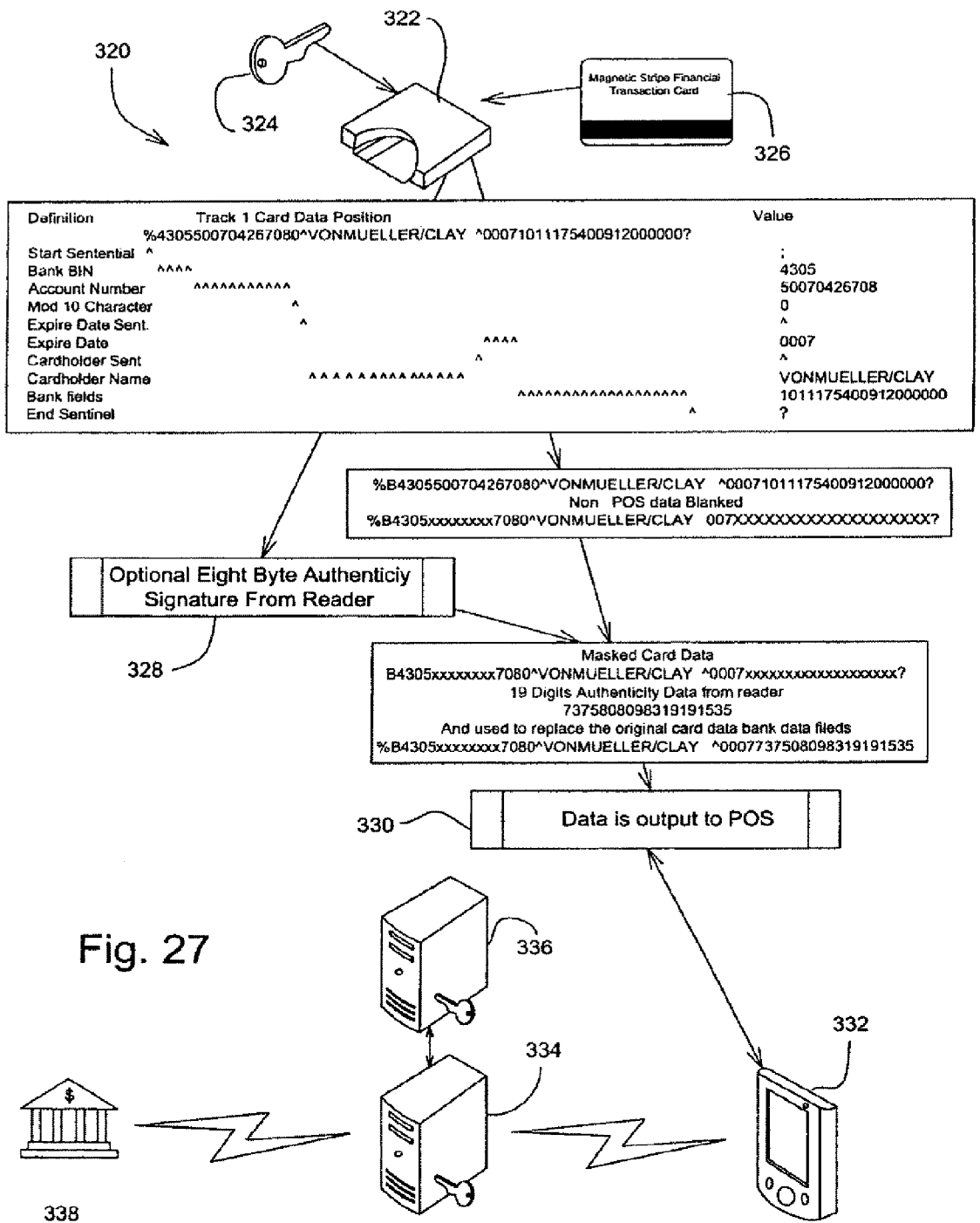
FIG. 27 is a flow diagram illustrating the enhanced data output format from an enhanced secure transducer head module with an optional card data signature generator and using the masked data format for track 1 data, constructed in accordance with the present.

Referring now to FIG. 27, there is illustrated a flow diagram of the enhanced data output format from an enhanced secure transducer head module with an optional card data signature generator using a hidden DES standard data format on track 1 data system 320, constructed in accordance with the present invention. In operation, the MSR 322 contains an encryption key 324 which is utilized to encrypt selected fields of track 1 data from the card 326. An optional 8 byte authenticity signature 328 from the MSR 322 sends masked data which is outputted to a POS 330. This data is then sent to a PDA device 322 and on to a decryption service module 334 linked to an optional card authenticity verification engine 336, before said data is sent on to the associated bank 338.

Figure 28:
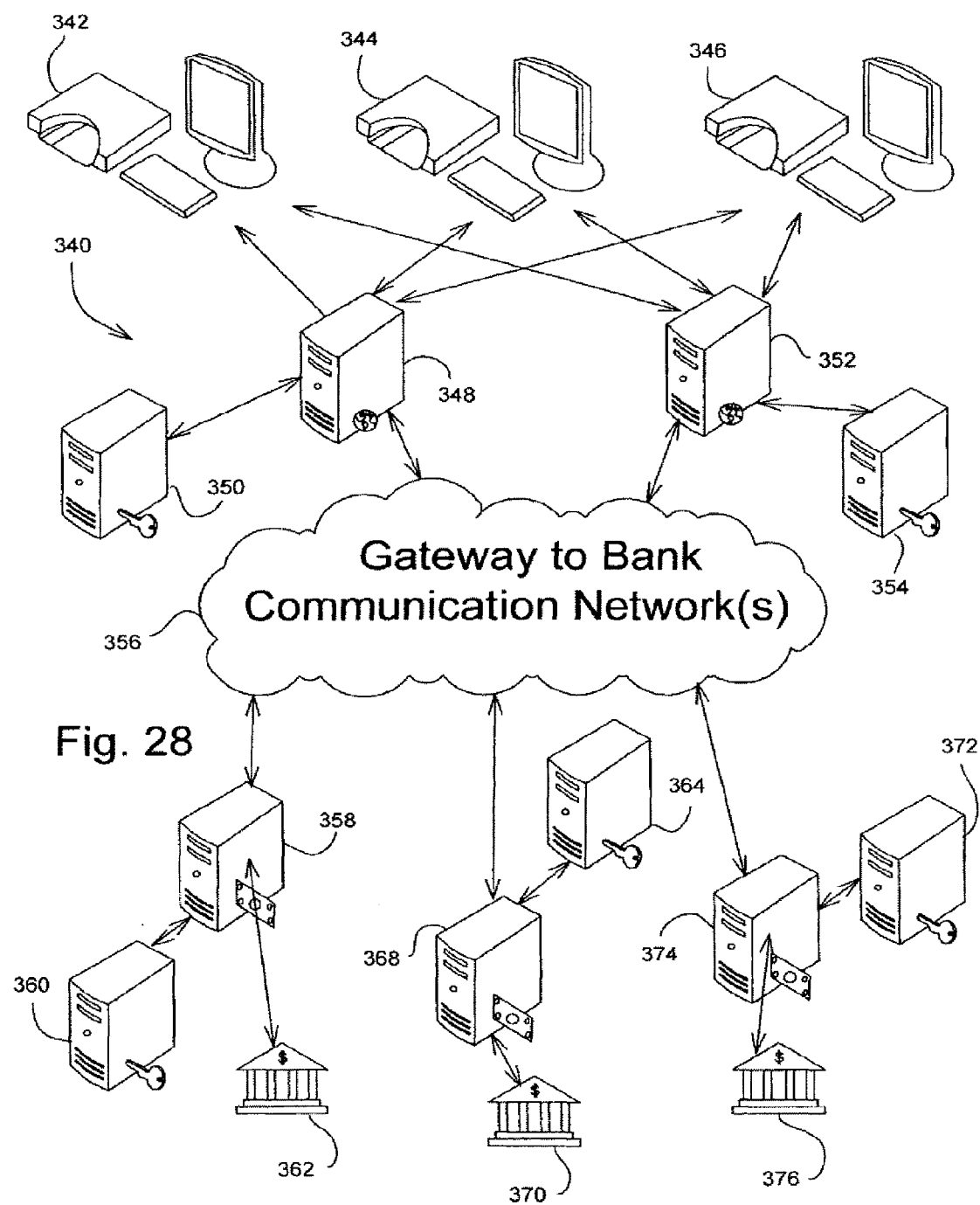
FIG. 28 is a flow chart illustrating the enhanced data output format from encrypted magnetic stripe data and an encrypted secure MSR transducer head module with a card data signature generator at a point of sale (POS), in communication with a gateway which decrypts the MSR encryption and to bank which decrypts the encrypted magnetic stripe, constructed in accordance with the present invention

Referring now to FIG. 28, there is illustrated a flow chart of the enhanced data output format from an encrypted secure MSR transducer head module with a card data signature generator using the CPI and hidden DES system, at a point of sale (POS), in communication with a gateway to bank communication networks, constructed in accordance with the present invention. In operation, encrypted MSRs at various POS stations 342, 344 and 346 are linked to POS gateway 1 348 and gateway 2 352 which are in continuous electronic communication with encryption key databases 350 for gateway 1 348 and encryption key database 354 for gateway 2 352. The gateways 348 and 352 communicate via a gateway to bank communication network or networks 356 which direct the information via secure connections to legacy transaction processors 358, 368 and 374. Each legacy transaction processor is linked to an encryption key database 360, 364 and 372, associated with a particular banks IT system. In this way the financial data can be directed to each bank 362, 370 and 376 in a form which the banking system can read.

It is a further contemplated object of the present invention to provide a method of sending card authentication signature such as used in Secure Stripe® card authentication system in the otherwise masked data fields of track 1, using an encrypted method similar to that used in the track 2 account encryption method shown. It should be noted that the encryption method and the data placement can be varied to suit any particular application, and using the same method as previously shown for track 2 data is merely a convenience. Data from any information track can be encrypted and utilized for this method and technique.

The following examples of applications, implementation and operations allowed by the present inventive system are provided to demonstrate the scope and flexibility of the system disclosed herein.

EXAMPLE 1

In one preferred embodiment of the secure magnetic stripe reader module consisting of a custom ASIC based magnetic head amplifier with integrated precision peak detector attached to a magnetic head and a microcontroller to decode the output of the ASIC and provide TDES encrypted data. The ASIC and a conventional processor, the Silicon Labs C8051F330, are placed on a PCB the size of the back of the magnetic head. The interface cable is attached to the PCB and the assembly mounts in shell of the magnetic head. The head is then potted with epoxy providing a secure barrier to the environment tampering.

In high security applications a small amount of reactive material such as potassium is placed in the module prior to potting. If the unit is tampered with the reactive material is exposed and causes a reaction destroying the sensitive circuit components. In addition a fuse is placed on the PCB with allows the programming and debug connections to the microcontroller to be broken during final assembly of a product preventing access to the internal operations of the unit. The microcontroller decodes the F2F data encoded on the card and them uses multiple algorithms to decode the F2F data into any of multiple standard formats including ISO 7811, AAMVA, JIS, CDL, raw data, and other custom formats which may be added by the OEM using the module in a custom product. The converted track data is then encrypted to TDES using two 64 bit keys which where previously stored in the flash memory of the controller. The data is then compressed and output in one of multiple formats.

The data output format is selected using the head interface connector option pins of through sending a command through the Rx data pin. The interface formats which can be selected are $I^2C$, SPI, NRZ, or USB which all are well known standards. In addition TTL clock and data per track which is well known in the magnetic card reading industry may also be selected. An additional format can be supported which outputs the encrypted data in same F2F format which is encoded on the card at signal levels compatible with magnetic head output. This allows for legacy hardware to use the secure head module without changing the terminal hardware. In addition the secure head module can accept commands via the interface connecter Rx data line or through the use of specially formatted cards which are swiped to execute the commands. An additional format can be supported which supports RF communications such as Bluetooth. The data is converted to a suitable format and sent to either a RF transceiver internal to the head module or connected to the head module though the interface connector cable.

These techniques allow for command operations in both WAP and java or Pocket PC thin client applications. In addition to the described card reader functions the unit provides general purpose digital input/output pins at the interface connector. These pins can be controlled by custom applications supplied by the OEM integrating the module in there products. These pins along with the ability to add custom application firmware to the head module allow for added functionality that without these options would require an additional processor and circuitry. One such example is in a serial RS232 stand alone magnetic stripe reader. The added interface pins can be used to control a status indicator and to control the RS232 output driver. In addition custom firmware can be added to output the suppliers banded information and to support custom formats such as those used at conferences to track attendees.

EXAMPLE 1

An encrypted secure magnetic head module in used to replace the magnetic head in a POS terminal to provide transparent operation for legacy systems.

EXAMPLE 2

In another preferred embodiment of the secure magnetic stripe reader module is placed in a cell phone or PDA attachment as an enhanced magnetic stripe reader with power management as described in pending patent application Ser. No. 10/074,086 titled Magnetic Stripe Reader for PDA and Method of Making Same. In this embodiment the functionality of the previous work is enhanced with TDES data encryption for security.

EXAMPLE 3

In another preferred embodiment of the secure magnetic stripe reader attachment for a handheld computing device such as a PDA or cell phone the secure magnetic stripe reader is mounted in conjunction with a secure pin entry keypad in the attachment device allow for secure PIN entry required to accept debit card transactions. Even with access to the internal components and wiring of the attachment the PIN number and card information are held securely inside each secure module with only encrypted data available via the internal wiring. Tampering with the secure reader or secure pin pad module makes the units inoperable.

EXAMPLE 4

In one preferred embodiment of the secure gateway server receives transaction requests from multiple devices employing the secure MSR module. The transaction data consists of the MSR serial number followed by three blocks of TDES encrypted data containing the swiped card's track 2 data along with a time or transaction number stamp. A second optional TDES data block contains control information to enhance the server's optional application operations such as card authenticity verification, issuing merchant and command requests such as a change key request. Three optional clear text characters are used to signal start of serial number, start of optional encrypted data block, and end of transaction blocks. The various clear text characters also indicate various encryption options such as selection between multiple encryption keys and formats.

Optionally for WAP based operations where transmission speed is a primary consideration, the transaction data format is adjusted to be a multiple of three characters in length. All transaction data including the serial number, encrypted data blocks, and clear text fields are sent as binary data. In this way a forty digit track two data block can be compressed from 40 to 20 bytes in length. The 8 digit serial number is compressed to 3 bytes in length. This converted binary data is converted to a format compatible with efficient keyboard emulation for the selected WAP device. In the case of Motorola WAP enabled cell phones with external keyboard support the each 3 bytes of binary data is converted to 4 mostly lower case ASCII characters. Using this technique the transaction data is sent in 38 characters rather then the 68 characters required if the data was not compressed.

This secure gateway has access to a secure database containing keys for all readers allowed access to the gateway. The reader serial number which is sent as part of the transaction in clear text is used to access the key for the readers track data block. The selected key is then used to decrypt the track data which is then packaged and forwarded a conventional wireless gateway for processing. In this way a secure transaction can be maintained over unsecured data paths while maintaining complete compatibility with the current transaction processing services.

EXAMPLE 5

In another preferred embodiment of the secure gateway server the transaction data consists of the MSR serial number followed by three blocks of TDES encrypted data containing the swiped card's track 2 data along with a time or transaction number stamp. A second TDES data block contains the secure stripe TM signature of the swiped card along with control information to enhance the server's optional application operations such as card authenticity verification, issuing merchant and command requests such as a change key request. Three optional clear text characters are used to signal start of serial number, start of optional encrypted data block, and end of transaction blocks. The various clear text characters also indicate various encryption options such as selection between multiple encryption keys and formats. This secure gateway has access to a secure database containing keys for all readers allowed access to the gateway along with information to complete the transaction such as the internet URL or the phone number of the transaction processing server to be used by this reader.

In addition the gateway has access to a database containing valid secure stripe TM signatures and authentication decryption keys. The reader serial number which is sent as part of the transaction in clear text is used to access the key for the readers track signature block along with information to complete the transaction such as the internet URL or the phone number of the transaction processing server to be used by this reader. The selected keys are used to decode signature data along with a hash code generated by the secure module from the card data account number. The hash value generated from the card data is used to index the secure stripe database to retrieve the card signature. The database signature is then compared to the decrypted transaction signature and based on the comparison the transaction is sent to the processing bank indicated in the signature database or a message is sent back to the card holder requesting verification of the card's authenticity which may be in the form of a re-swipe of the card or entry of additional information such as billing zip code at which point the transaction is sent to the processing bank using standard formats or declined.

EXAMPLE 6

In yet another preferred embodiment of the secure gateway server the transaction data consists of the MSR serial number followed by blocks of encrypted data containing the swiped card's track information along with a time or transaction number stamp and GPS location if available. A second TDES data block contains the secure stripe TM signature of the swiped card along with control information to enhance the server's optional application operations such as card authenticity verification, issuing merchant and command requests such as a change key request. Three optional clear text characters are used to signal start of serial number, start of optional encrypted data block, and end of transaction blocks.

The various clear text characters also indicate various encryption options such as selection between multiple encryption keys and formats. This secure gateway has access to two databases one containing the secure MSR module control block key and a second containing valid secure stripe TM signatures. The reader serial number which is sent as part of the transaction in clear text is used to access the key for the readers track control and signature block. The signature consists of two parts one is the signature value generated during the card swipe and a second is a hash code of that track two card data also generated during the swipe. The hash value is used to index the secure stripe database to retrieve the card signature. In this way, no card data is available on the secure server. The database signature is then compared to the decrypted transaction signature generating a card reliability index which is sent to the processing bank as additional information.

The bank also receives the encrypted card data may include the time of the transaction, the location of the transaction, and the secure modules unique transaction number. With this additional information the bank can made a more accurate ascertainment of the transactions authenticity prior to acceptance or denial of the requested transaction.

It should be noted that even though these examples and the supplied figures illustrate the use of the internet as the communication method of choice and communication method such as leased phone lines, POTS, microwave point to point link may be used in place of the internet method. It should be further noted that Legacy systems such as employed by Veri Fone and Hypercom using POTS and leased lines also benefit form the described art for both Legacy and new system implementations.

It should be understood, however, that even though these numerous characteristics and advantages of the invention have been set forth in the foregoing description, together with details of the structure and function of the invention, the disclosure is illustrative only, and changes may be made in detail, especially in matters of shape, size, construction, materials, chemistry and arrangement of parts within the principal of the invention to the full extent indicated by the broad general meaning of the terms in which the appended claims are expressed.

The invention claimed is:

1. A method for encrypting bank card data from a bank card presented for a purchase transaction and for presenting encrypted bank card data to a transaction processing network for the purchase, the method comprising:

a point of sale bank card reader receiving a first set of bank card data from the bank card presented to the point of sale card reader for the purchase transaction, wherein the first set of data comprises clear text bank card data read from the bank card at the point of sale;

the bank card reader encrypting a selected subset of characters of the clear text bank card data read from the bank card at the point of sale;

the bank card reader replacing the original selected subset of characters of the card data with the encrypted selected subset of characters of the card data thereby creating encrypted bank card transaction data;

the bank card reader performing a mod 10 calculation on the encrypted bank card transaction data;

the bank card reader determining a digit that can be inserted into the encrypted bank card transaction data to cause a modulo 10 arithmetic check of the encrypted bank card transaction data to yield the same result as a modulo 10 arithmetic check would yield on the clear text bank card data read from the bank card at the point of sale;

inserting the digit into the encrypted bank card transaction data; and forwarding the encrypted bank card transaction data with the digit to the transaction processing network for the purchase transaction.

2. The method of claim 1, wherein the encrypted bank card transaction data comprises a string of encrypted token data and clear text token data, and the encrypted hank card transaction data is assembled in the same format as the clear text bank card data.

3. The method of claim 1, wherein the first set of bank card data comprises an account number.

4. The method of claim 1, wherein the digit is inserted into the encrypted bank card transaction data at a predetermined location of the encrypted bank card transaction data and an original mod 10 check digit in the first set of bank card data remains in the encrypted bank card transaction data and is recoverable upon decryption of the encrypted bank card transaction data.

5. The method of claim 1, wherein the first set of token data is track data from a track of the bank card.

6. The method of claim 1, wherein the first set of token data is a personal account number encoded on the bank card.

7. The method of claim 1, wherein the clear text bank card data comprises a mod 10 check digit.

8. The method of claim 1, wherein the encrypting selected characters comprises converting the selected characters to eight bytes, and performing an triple DES encryption on the selected token data.

9. The method of claim 1, wherein the selected subset of characters comprises some or all of the first set of bank card data.

10. The method of claim 1, wherein the encrypting a selected subset of characters and creating encrypted bank card transaction data comprises:
converting X digits of the first set of bank card to a predetermined number of Y bytes; and
performing a Y-byte encryption on the converted card data; and
convert the encrypted Y bytes of encrypted data to X digits.

11. The method of claim 10, wherein performing the modulo arithmetic and inserting the mod 10 check digit comprises performing a modulo calculation on the X digits to determine the mod 10 check digit and inserting the mod 10 check digit in the appended predetermined digit.

12. The method of claim 1, wherein the encrypted selected subset of characters of the card data replaces the original selected subset of characters of the card data at the same location or locations in the first set of bank card data.

13. The method of claim 1, wherein at least one of the steps of encrypting and replacing is performed inside a magnetic stripe read head of the point of sale bank card reader.

14. A computer program product comprising a computer readable non-transitory storage medium having computer readable code embodied thereon that is configured to cause a processor to perform a method for encrypting bank card data from a bank card presented for a purchase transaction and for presenting encrypted bank card data to a transaction processing network for the purchase, the method comprising:
a point of sale bank card reader receiving a first set of bank card data from the bank card presented to the point of sale card reader for the purchase transaction, wherein the first set of data comprises clear text bank card data read from the bank card at the point of sale;
the bank card reader encrypting a selected subset of characters of the clear text bank card data read from the bank card at the point of sale;
the bank card reader replacing the original selected subset of characters of the card data with the encrypted selected subset of characters of the card data thereby creating encrypted bank card transaction data;
the bank card reader performing a mod 10 calculation on the encrypted bank card transaction data;
the bank card reader determining a digit that can be inserted into the encrypted bank card transaction data to cause a modulo 10 arithmetic check of the encrypted bank card transaction data to yield the same result as a modulo 10 arithmetic check would yield on the clear text bank card data read from the bank card at the point of sale;
inserting the digit into the encrypted bank card transaction data; and
forwarding the encrypted bank card transaction data with the digit to the transaction processing network for the purchase transaction.

15. The computer program product of claim 14, wherein the encrypted bank card transaction data comprises a string of encrypted token data and clear text token data, and the encrypted bank card transaction data is assembled in the same format as the clear text bank card data.

16. The computer program product of claim 14, wherein the first set of bank card data comprises an account number.

17. The computer program product of claim 14, wherein the digit is inserted into the encrypted bank card transaction data at a predetermined location of the encrypted bank card transaction data and an original mod 10 check digit in the first set of bank card data remains in the encrypted bank card transaction data and is recoverable upon decryption of the encrypted bank card transaction data.

18. The computer program product of claim 14, wherein the first set of token data is track data from a track of the bank card.

19. The computer program product of claim 14, wherein the first set of token data is a personal account number encoded on the bank card.

20. The computer program product of claim 14, wherein the clear text bank card data comprises a mod 10 check digit.

21. The computer program product of claim 14, wherein the encrypting selected characters comprises converting the selected characters to eight bytes, and performing an triple DES encryption on the selected token data.

22. The computer program product of claim 14, wherein the selected subset of characters comprises some or all of the first set of bank card data.

23. The computer program product of claim 14, wherein the encrypting a selected subset of characters and creating encrypted bank card transaction data comprises:
converting X digits of the first set of bank card to a predetermined number of Y bytes; and
performing a Y-byte encryption on the converted card data; and
converting the encrypted Y bytes of encrypted data to X digits.

24. The computer program product of claim 23, wherein performing the modulo arithmetic and inserting the mod 10 check digit comprises performing a modulo calculation on the X digits to determine the mod 10 check digit and inserting the mod 10 check digit in the appended predetermined digit.

25. The computer program product of claim 14, wherein the encrypted selected subset of characters of the card data replaces the original selected subset of characters of the card data at the same location or locations in the first set of bank card data.

26. The computer program product of claim 14, wherein at least one of the steps of encrypting and replacing is performed inside a magnetic stripe read head of the point of sale bank card reader.

* * * * *